United States Patent
Li et al.

(10) Patent No.: US 12,111,817 B2
(45) Date of Patent: Oct. 8, 2024

(54) LOG EXECUTION METHOD AND APPARATUS, COMPUTER DEVICE AND STORAGE MEDIUM

(71) Applicant: TENCENT TECHNOLOGY (SHENZHEN) COMPANY LIMITED, Shenzhen (CN)

(72) Inventors: Haixiang Li, Shenzhen (CN); Haohua Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/079,238

(22) Filed: Dec. 12, 2022

(65) Prior Publication Data

US 2023/0110826 A1    Apr. 13, 2023

Related U.S. Application Data

(63) Continuation of application No. PCT/CN2022/074080, filed on Jan. 26, 2022.

(30) Foreign Application Priority Data

Feb. 9, 2021    (CN) .......................... 202110178645.4

(51) Int. Cl.
*G06F 7/00*    (2006.01)
*G06F 11/14*    (2006.01)
(Continued)

(52) U.S. Cl.
CPC ...... *G06F 16/2365* (2019.01); *G06F 11/1469* (2013.01); *G06F 16/2379* (2019.01); *G06F 16/27* (2019.01); *G06F 2201/80* (2013.01)

(58) Field of Classification Search
None
See application file for complete search history.

(56) References Cited

U.S. PATENT DOCUMENTS

| 2016/0070652 A1* | 3/2016 | Sundararaman ...... G06F 3/0665 |
| | | 711/154 |
| 2018/0329944 A1 | 11/2018 | Horii et al. |

(Continued)

FOREIGN PATENT DOCUMENTS

| CN | 104516959 A | 4/2015 |
| CN | 107665219 A | 2/2018 |

(Continued)

OTHER PUBLICATIONS

China National Intellectual Property Administration (CNIPA) Office Action 2 for 202110178645.4 Apr. 26, 2021 14 Pages (including translation).

(Continued)

*Primary Examiner* — Tuan A Pham
(74) *Attorney, Agent, or Firm* — ANOVA LAW GROUP, PLLC

(57) ABSTRACT

This application provides a log execution method and apparatus, a computer device and a storage medium and relates to the technical field of databases. The method includes circularly scanning a log execution active window, the log execution active window comprising a plurality of logs which are not executed, and all the logs before the log execution active window having been executed; acquiring a conflict verification result of a log in the log execution active window based on storage range information of the log, the storage range information indicating a storage range of the log and a storage range of a target number of logs before the log, and the target number being equal to a size of the log (Continued)

```
┌─────────────────────────────────────────────────────────────┐
│ A first node device cyclically scans a log execution active │  ─ 301
│ window, where the log execution active window includes a   │
│ plurality of logs which have not been executed, and all    │
│ logs before the log execution active window have been      │
│ executed                                                    │
└─────────────────────────────────────────────────────────────┘
                              │
                              ▼
┌─────────────────────────────────────────────────────────────┐
│ For any log in the log execution active window, the first  │  ─ 302
│ node device obtains a conflict verification result of the  │
│ log based on storage range information of the log, where   │
│ the storage range information is used for indicating a     │
│ storage range of the log and a storage range of a target   │
│ number of logs before the log, and the target number is    │
│ equal to a size of the log execution active window         │
└─────────────────────────────────────────────────────────────┘
                              │
                              ▼
┌─────────────────────────────────────────────────────────────┐
│ The first node device executes the log if the conflict     │  ─ 303
│ verification result is no conflict                         │
└─────────────────────────────────────────────────────────────┘
``` execution active window; and executing the log if the conflict verification result is no conflict.

18 Claims, 10 Drawing Sheets

(51) Int. Cl.
  *G06F 16/23* (2019.01)
  *G06F 16/27* (2019.01)
  *G06F 17/00* (2019.01)

(56) References Cited

U.S. PATENT DOCUMENTS

| | | |
|---|---|---|
| 2020/0183951 A1 | 6/2020 | Mittal et al. |
| 2021/0064500 A1* | 3/2021 | Przestrzelski ......... G06F 11/079 |
| 2021/0320977 A1 | 10/2021 | Huang et al. |
| 2022/0171800 A1* | 6/2022 | Kumaresan ........... G06F 16/358 |

FOREIGN PATENT DOCUMENTS

| | | |
|---|---|---|
| CN | 111159252 A | 5/2020 |
| CN | 111338766 A | 6/2020 |
| CN | 111352943 A | 6/2020 |
| CN | 112527759 A | 3/2021 |

OTHER PUBLICATIONS

The World Intellectual Property Organization (WIPO) International Search Report for PCT/CN2022/074080 Apr. 8, 2022 6 Pages (including translation).
Diego Ongaro et al., "In Search of an Understandable Consensus Algorithm", Jun. 30, 2014, 2014 UNSENIX Annual Technical Conference.
The European Patent Office (EPO) The Extended European Search Report for 22752140.8 Apr. 15, 2204 8 Pages.
Wei Cao et al. "PolarFS: an ultra-low latency and failure resilient distributed file system for shared storage cloud database." Proceedings of the VLDB Endowment 11.12 (2018): 1849-1862.

* cited by examiner

LOG EXECUTION METHOD AND APPARATUS, COMPUTER DEVICE AND STORAGE MEDIUM

RELATED APPLICATIONS

This application is a continuation of PCT Application No. PCT/CN2022/074080, filed on Jan. 26, 2022, which claims priority to Chinese Patent Application No. 202110178645.4, filed on Feb. 9, 2021, and entitled "LOG EXECUTION METHOD AND APPARATUS, COMPUTER DEVICE AND STORAGE MEDIUM". The two applications are both incorporated herein by reference in their entirety.

FIELD OF THE TECHNOLOGY

This application relates to the technical field of databases, in particular to a log execution method and apparatus, a computer device and a storage medium.

BACKGROUND OF THE DISCLOSURE

With the development of the database technology, for industrial-grade distributed storage systems, it is necessary to guarantee that all committed modifications are in the system. Therefore, it is necessary to introduce a consistency algorithm (namely, a consensus algorithm) to guarantee the reliability and the consistency of data in a file system. Among them, raft algorithm is widely used in engineering fields.

SUMMARY

The embodiments of this application provide a log execution method and apparatus, a computer device and a storage medium.

One aspect of the present disclosure provides a log execution method applied to a first node device in a distributed storage system. The method includes circularly scanning a log execution active window, the log execution active window comprising a plurality of logs which are not executed, and all the logs before the log execution active window having been executed; acquiring a conflict verification result of a log in the log execution active window based on storage range information of the log, the storage range information indicating a storage range of the log and a storage range of a target number of logs before the log, and the target number being equal to a size of the log execution active window; and executing the log if the conflict verification result is no conflict.

Another aspect of the present disclosure provides a computer device, including one or more processors and one or more memories, the one or more memories storing at least one computer program, the at least one computer program being loaded and executed by the one or more processors to implement the above log execution method.

Another aspect of the present disclosure provides a computer readable storage medium, storing at least one computer program, the at least one computer program being loaded and executed by a processor to implement the above log execution method.

DESCRIPTION OF EMBODIMENTS

Figure 1:
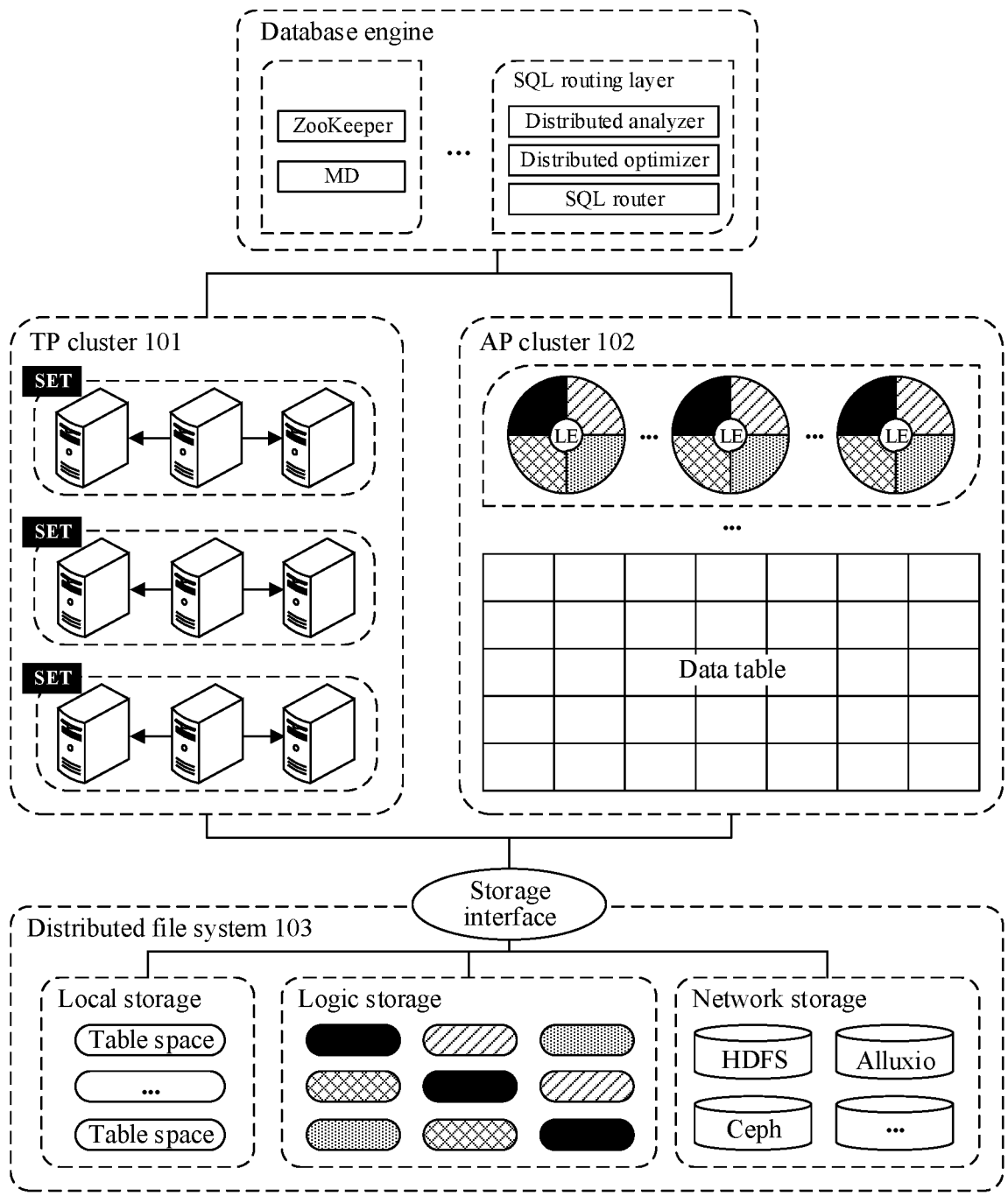
FIG. 1 is a schematic diagram of an architecture of a distributed storage system provided by an embodiment of this application.

To make the objectives, technical solutions, and advantages of this application clearer, implementations of this application are further described below in detail with reference to the accompanying drawings.

The terms "first", "second", and the like in this application are used for distinguishing between same items or similar items of which effects and functions are basically the same. It should be understood that the "first", "second", and "nth" do not have a dependency relationship in logic or time sequence, and a quantity and an execution order thereof are not limited.

The term "at least one" in this application means one or more and "a plurality of" means two or more. For example, a plurality of first positions means two or more first positions.

Before the embodiments of this application are introduced, it requires to introduce basic conceptions in some cloud technical fields, which will be introduced below.

Cloud Technology: it is a hosting technology that unifies a series of resources such as hardware, software, and networks in a wide area network or a local area network to implement computing, storage, processing, and sharing of data, that is, a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support of the field of the cloud technology. A background service of a technical network system requires a large amount of computing and storage resources, such as video websites, image websites, or more portal websites. As the Internet industry is highly developed and applied, each article may have its own identifier in the future and needs to be transmitted to a background system for logical processing. Data at different levels is separately processed, and data in various industries requires strong system support, which can be implemented through cloud computing.

Cloud storage: It is a new concept obtained by extension and development from a cloud computing concept. A distributed cloud storage system (hereinafter referred to as storage system) refers to a storage system which integrates a large number of different types of storage devices (which are also referred to as storage nodes) in a network by application software or application interfaces through functions of cluster application, the grid technology, a distributed storage file system and the like for cooperative work, to collectively provide functions of data storage and business access.

Database: In short, it can be regarded as an electronic filing cabinet-a place where electronic files are stored, to support a user to make addition, query, updating, deletion and other operations on the data in the files. A "database" is a collection of data that is stored together, can be shared with multiple users, has redundancy as little as possible and is independent of an application.

Full state of data: Based on a state attribute, data in the foregoing database system may include three states: current state, transitional state, and historical state. The three states are collectively referred to as "a full state of data". Such data is referred to as full state data for short. Different state attributes in the full state data are used for identifying states of data in a life cycle track thereof.

Current state: the latest version of a data item is a data item in a current phase.

Historical state: a historical state of the data item with a value being an old value and not a current value. In some embodiments, a plurality of historical-state data items correspond to a same primary key identification, reflecting the process of state transitions of various data items having the primary key identification. The data items in the historical state can only be read and cannot be modified or deleted.

Transitional state: data, which is neither data item in the current state nor a data item in the historical state, and is in a transition state from a current state to the historical state, is also referred to as half-life data.

In some embodiments, different data items have the same primary key identification (PK). Various data items having the same primary key identification form a full-state data set; and various data items in the full-state data set is essentially used for representing full-state data. That is, in the process of making multiple modifications (or deletions) on an initial data item having the primary key identification, a plurality of different versions generated from different modification (or deletion) moments form the full-state data set. In the full-state data set, some data items are in the current state, some data items are in the transition state, and some data items are in the historical state. The full-state data set here refers to an abstract and virtual set concept, and various data items in the same full-state data set can be stored on different physical machines in a distributed manner. In some embodiments, when various data items are stored, a database system employs a pointer to link various data items corresponding to the same primary key identification according to a time sequence, for convenience in querying a life cycle trajectory of the full-state data.

Transaction: transaction is a logical unit of a database management system in the process of executing operations, is composed of a limited sequence of database operations and is a minimum execution unit of operations of the database system. Within a system, the unit of each series of operations is called a transaction, and a single operation is also called a transaction. Transactions require to comply with the ACID principle, where ACID is an abbreviation for atomicity, consistency, isolation and durability.

Log: the logs involved in the embodiments of this application are also referred to as log items and log records and all refer to transaction logs in the distributed storage system. In each transaction log, data changes are recorded in a series of consecutive log records, each of which is stored in a virtual log file. In some embodiments, each transaction log has any number of virtual log files, the number depends on a database engine, and the size of each virtual log file is not fixed.

With a database in the structured query language (SQL) Server in a relational data management system as an example, the databases in the SQL Server are all composed of one or more data files and one or more transaction log files, where the data files mainly store data (also referred to as data items and data records), including a database content structure, a data page, an index page and the like, in the database; and each transaction log is mainly used for saving database modification records, in other words, each transaction log is used for recording all transactions and the modifications made by each transaction on the database and is an important component for backup and restore of the database system. In a database, if the integrity of ACID requires to be guaranteed, a transaction requires to rely on a transaction log for tracing, namely, each operation of a transaction requires to be written to the log before being written to a disk. For example, if the transaction is to delete a certain line of data records in a data table, the line of data records in the log are marked for deletion first; however, no change has been made in a data file; and only after the transaction is committed, a SQL statement in the transaction can be written to the disk, namely, the line of data records is deleted from the data table.

In some embodiments, the log includes a redo log, an undo log and a bin log (also referred to as an archived log), where the redo log is used for recording data changes caused by a transaction operation, a record is physical modification of a data page, and therefore, the redo log is a kind of a physical logs for recording how the transaction modifies a certain data; the bin log is mainly used for recording change situations, the content of which includes all update operations of the database, of the database, all operations involving data changes are recorded in the bin log, and the bin log is a kind of logical logs for recording an original logic of the SQL statement; and a function of a undo log is to rollback data. If the transaction modifies the database, the database engine can record the redo log and can further generate a corresponding undo log; if the transaction fails to execute or calls a Rollback interface, resulting in the transaction needing to rollback, the data can be rolled back to a previous state by using information in the undo log; and the undo log is a kind of logical log for recording and information related to execution of the SQL statement.

The distributed storage system in the embodiments of this application includes a distributed database system and a distributed database management system using a similar architecture, for example, the distributed storage system is a distributed transactional database system, requiring a distributed transaction processing capability and a consistency model for shared data.

At least one node device is included in the distributed storage system, one or more data tables are stored in a database of each node device, and each data table is used for storing one or more data items (also referred to as variable versions), where the database of the node device is any type of distributed database, including at least one of a relational database or a non-relational database, for example, a SQL (Structured Query Language) database, a NoSQL, a NewSQL (generally referring to various new extensible/high performance databases) and the like. The embodiments of this application do not specifically define the type of the database.

In some embodiments, the embodiments of this application are applied to a database system based on a blockchain technology (hereinafter referred to as "blockchain system"); the above-mentioned blockchain system is a decentralized distributed database system; a consensus algorithm is employed to keep ledger data recorded by different node devices on a blockchain consistent; the encrypted transmission and non-tampering of the ledger data between different node devices are guaranteed through a cryptographic algorithm; a ledger function is expanded through a script system; and interconnection between different node devices is performed via network routing.

The blockchain system includes one or more blockchains; each blockchain is a series of data blocks generated in association using a cryptographic method; and each data block contains information of a batch of network transactions for verifying the validity (anti-counterfeiting) of the information and generating a next block.

A Peer To Peer (P2P) network is formed among node devices in the blockchain system; and a P2P protocol is an application layer protocol running on a transmission control protocol (TCP). In the blockchain system, any node device has following functions of: A) routing which is a basic function of each node device for supporting communication between the node devices; B) an application for being deployed in a blockchain, implementing a specific business according to actual service requirements, recording data related to function implementation to form ledger data, carrying a digital signature in the ledger data to represent a data source, and sending the ledger data to other node devices in a blockchain system for other node devices to add the ledger data to a temporary block if the source and integrity of the ledger data are verified successfully, where the business implemented by the application includes a wallet, a shared ledger, an intelligent contract and the like; and C) a blockchain, including a series of blocks which successively follow each other in a chronological order; a new block cannot be removed any more once being added to the blockchain; and the block records the ledger data committed by each node device in the blockchain system.

In some embodiments, each block includes a hash value (of this block) for storing a transaction record and a hash value of a previous block; and various blocks are connected by the hash values to form a blockchain; and in some embodiments, the block further includes information such as a timestamp indicating a block generation time.

FIG. 1 is a schematic diagram of an architecture of a distributed storage system provided by an embodiment of this application, with the distributed storage system serving as a hybrid transaction/analytical cluster (HTAC) system as an example for illustration. Referring to FIG. 1, the HTAC system includes a transaction processing (TP) cluster 101 and an analytical processing (AP) cluster 102.

The TP cluster 101 is used for providing transaction processing services. The TP cluster 101 includes a plurality of TP node devices; and during transaction processing, each TP node device is used for processing current-state data, where each TP node device is a stand-alone device or a one-master-and-multi-slave cluster. The embodiments of this application do not specifically define the type of the TP node device.

The AP cluster 102 is used for storing historical-state data and providing a query and analysis service of the historical-state data. In some embodiments, The AP cluster 102 includes a global timestamp generation cluster and a distributed storage cluster; the distributed storage cluster includes a plurality of AP node devices; and certainly, each AP node device is a stand-alone device or a one-master-and-multi-slave cluster. The embodiments of this application do not specifically define the type of the AP node device.

In the above-mentioned architecture, a database instance set of master machines or a slave machines corresponding to various TP node devices is referred to as a SET (set); for example, if a certain TP node device is a stand-alone device, then the SET of this TP node device is only a database instance of the stand-alone device; if the TP node device is a one-master-and-two-slave cluster, the SET of this TP node device is a set of a master machine database instance and two slave machine database instances; a strong synchronization technology based on a cloud database is employed to guarantee the consistency between data of master machine and copy data of slave machines; and in some embodiments, each SET performs linear capacity growth to cope with business processing requirements in large data scenarios.

In some embodiments, various AP node devices store the historical-state data generated by the TP cluster 101 in a local database, and accesses a distributed file system 103 via a storage interface to provide an unlimited storage function for the historical-state data generated by the TP cluster 101 via the distributed file system 103, for example, the distributed file system 103 includes but is not limited to: a Hadoop distributed file system (HDFS), Ceph (a distributed file system under Linux system), Alluxio (a distributed file system based on an internal memory) and the like.

In some embodiments, since the TP node devices provide transaction processing services, when any transaction is committed, historical-state data corresponding to the current-state data can further be generated while new current-state data is generated; and since the historical-state data can occupy a more storage space, the historical-state data further has a preservation value. Therefore, the TP node devices atomically migrate the generated historical-state data to the AP cluster 102 through a predefined historical-state data migration strategy. Each AP node device in the AP cluster 102 dumps the historical-state data based on a local executor (LE) and registers meta information of each data migration into a metadata (MD) administrator, so that the AP cluster 102 can conveniently count the meta information of the reserved data based on the MD administrator.

In some embodiments, a user end queries any data stored in the TP cluster 101 or the AP cluster 102 through routing based on a query statement and the semantics and metadata of a query operation provided in a SQL router (SR for short) layer; and certainly, the TP cluster 101 mainly provides a query service for the current-state data, and the AP cluster 102 mainly provides a query service for the historical-state data.

In some embodiments, the TP cluster 101 or the AP cluster 102 is an independent physical server is may be a server cluster or a distributed system formed by a plurality of physical servers, or may be a cloud server that provides a basic cloud computing service such as a cloud service, a cloud database, cloud computing, a cloud function cloud storage, a network service, cloud communication, a middleware service, a domain name service, a security service, a content delivery network (CDN), big data, and an artificial intelligence platform This is not limited in the embodiments of this application.

In some embodiments, the user end, namely, the terminal, is a smartphone, a tablet computer, a notebook computer, a desktop computer, a smart speaker, a smartwatch, or the like, but is not limited thereto. The terminal and the TP cluster 101 can be directly or indirectly connected in a wired or wireless communication manner. This is not limited in this application.

The HTAC system described above is an illustration of both the distributed database system and the distributed transactional database system, requiring the distributed transaction processing capability and a consistency model for shared data. The HTAC system described above can achieve more efficient anomaly identification on more data and efficient a serializable isolation level, so that the HTAC system can adapt to a variety of business scenarios.

For example, if being used, a strict serializable level can be well applicable to the financial field to guarantee the reliability of data, while the current mainstream distributed database systems cannot efficiently provide this consistency level. For another example, if being used, a weak consistency level can be well applicable to an Internet scenario, so that a highly concurrent real-time database service is provided, and a good product experience is provided for and Internet user.

In addition, for the above-mentioned HTAC system, in the case of multiple copies of data, a storage layer needs a consensus protocol to guarantee the consistency and high availability of the data, which is the specific background of the technical dependence provided by the embodiments of this application. In summary, the log execution method and relevant theories (referring to a concurrent Raft algorithm and a Parallel Raft algorithm) involved in the embodiments of this application can improve the technical content, the technical threshold, the competitiveness and the technical influence of a database product, which has a strong practical significance. Also, the log execution method described above can effectively guarantee the correctness of user data and can further have a good performance in the aspect of performance.

In the correlative art, development of the distributed storage technology balances the contradiction between the expanding application storage requirement and the bottleneck of the single-point storage capacity. The consistency problem is the core problem to guarantee the correctness and the reliability of a distributed system. However, for an industrial-grade distributed storage system, it is necessary to guarantee that all committed modifications are not missing. Therefore, it is necessary to introduce a consistency algorithm (namely, a consensus algorithm) to guarantee the reliability and the consistency of data in the file system.

From the mature perspective of engineering implementation, the Raft algorithm proposed by Diego Ongaro et al. of Stanford University has gradually become one of the mainstream consistency algorithms in the field of distributed systems. The Raft algorithm is the consistency algorithm based on a master-slave model and guaranteeing strong consistency and is very easy to understand, develop and implement.

In the Raft algorithm, a replicated log is managed based on a master-slave mode; in each round of term, a node can be elected to serve as a leader (a master node in the Raft algorithm, namely, the first node device), and the remaining nodes serve as followers (slave nodes in the Raft algorithm, namely, the second node devices); and only the leader can respond to a request from the terminal and send the request to other followers.

Since the Raft algorithm is divided into leader election, log replication, security and other parts, for the simplicity and the understandability of the algorithm, the Raft algorithm adopts a highly serialized design; and the logs are not allowed to be missing on the leader and followers, that is to say, all the logs can be confirmed by the followers in sequence, then committed (Commit) by the leader and then executed (Apply) on all the copies. In other words, the distributed storage system based on the Raft algorithm can only commit a large number of concurrent write requests of a database application (namely, a terminal side) in sequence, but cannot process the requests concurrently to improve system performance.

With regard to the Raft algorithm, in a high-concurrency scenario with multiple connections, the leader and the followers usually use multiple connections to send the logs concurrently in an engineering scenario. If a connection is blocked or slows down, the order in which the logs arrive at the followers can be disordered, that is to say, the logs stored in the leader can be sent to the followers out of order; and the logs later in the order (namely, indexes) can arrive at the followers before the logs earlier in the order.

Based on the mechanism of the Raft algorithm, the followers require to receive the logs in order. Since the logs arrive at the followers out of order, the problem of missing the logs of the followers can occur. Only after blocking the committing process of all out-of-order logs until the missing logs arrive at the followers, the followers can cancel the blockage, resulting in reduced throughput of the system. In addition, the entire system can get stuck when a plurality of followers are blocked due to individual missing logs.

It can be seen from the above that the Raft algorithm is not applicable to a high-concurrency scenario due to the characteristic of strict serialization, so that the throughput of the distributed system is severely limited; and the distributed storage system needs to use a high-concurrency I (Input)/O (Output) capability to improve the throughput of the system. Therefore, the embodiments of this application provide a log execution method which can release the constraint of strict ordering of a conventional Raft algorithm, namely, an improved consensus algorithm based on the Raft algorithm (referred to as a Parallel Raft (concurrent Raft) algorithm) is designed.

The concurrent Raft algorithm is applied to the distributed storage system, and the distributed storage system includes a first node device (Leader, leader node) and a plurality of second node devices (Follower, follow node). The concurrent Raft algorithm relates to a log out-of-order replication mechanism based on the distributed storage system. The log out-of-order replication mechanism includes an acknowledgment (ACK) phase for a business request and out-of-order logs received by the first node device from the terminal, a log out-of-order Commit phase and a log out-of-order execution (Apply) phase.

For ease of understanding and development and implementation, the conventional Raft algorithm adopts a highly serialized design; and the logs in the log list of the first node device and in the log lists of the second node device are disallowed to be missing (also referred to as "holes"). It means that all the logs can be acknowledged by the second node devices in sequence, committed by the first node device in sequence and finally executed on all the copies in sequence.

The conventional Raft algorithm guarantees serialization by the following modes: when the first node device sends a log to the second node devices, the second node devices need to return a acknowledge character (ACK) message to acknowledge that the log has been received and recorded and implicitly indicates that all the previous logs have been received and are persistently stored at the same time; and if the first node device has committed a log and broadcast the log to all the second node devices, it could have been confirmed that all the logs before the committed log have been committed at the same time.

However, in the concurrent Raft algorithm, the above-mentioned serialization limitation is broken, so that the logs can be copied from the first node device to the second node devices concurrently and out-of-order; and similarly, the second node devices can acknowledge the received logs concurrently and out-of-order, so that the first node device can commit the logs concurrently and out-of-order according to log reception statistics.

Figure 2:
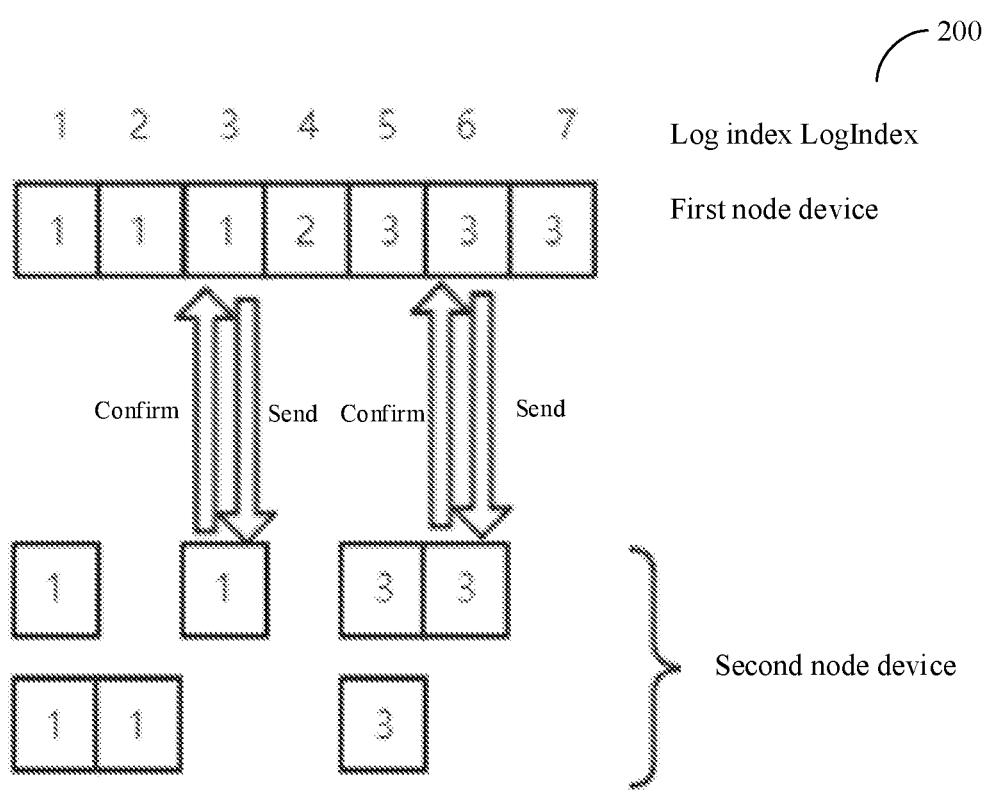
FIG. 2 is a schematic diagram of a principle of a log out-of-order replication mechanism provided by an embodiment of this application.

FIG. 2 is a schematic diagram of a principle of a log out-of-order replication mechanism provided by an embodiment of this application. As shown at 200, the first node device sends logs with Index=3 and Index=6 to all the second node devices in parallel; while after a certain second node device receives the log with Index=3, even if the previous log with Index=2 is missing (due to the fact that the out-of-order replication mechanism has not yet arrived at this second node device), the second node device can immediately return the ACK message to the first node device; and similarly, after the second node device receives the log with Index=6, even if the previous logs with Index=2 and Index=4 are missing, the second node device can immediately return the ACK message to the first node device.

In the above-mentioned process, any log under the concurrent Raft algorithm can immediately return the ACK message after being successfully persisted on the second node devices without waiting for the logs before this log in the log list to be acknowledged in sequence; and in addition, the first node device can commit the log after most copies of the log are acknowledged without waiting for the logs before this log in the log list to be committed. It is to be noted that Out-of-order commitment is performed within limits of the log committing (Commit) active window, that is, one log within the log committing active window is not limited to other logs within the log committing active window other than this log; and the log committing active window is used for supporting out-of-order commitment of the logs. The log out-of-order committing mechanism will be described in subsequent embodiments and will not be described here.

The above-mentioned log out-of-order acknowledgment mechanism, log out-of-order committing mechanism and log out-of-order execution mechanism may cause a phenomenon that a log in a log list on each second node device is missing, so that the difficulty for safely applying the log to a state machine (namely, execution), is creased; and execution of a subsequent log needs to consider whether it conflicts with a previous log which has not been executed.

In order to guarantee the data consistency of the entire distributed storage system when the logs are replicated out of order by the distributed storage system, the correctness condition of storage semantics needs to be introduced, and only the logs satisfying the correctness condition of the storage semantics can be replicated out of order.

The concurrent Raft algorithm can be acknowledged and committed out of order, resulting in each log may have missing copies on different second node devices (that is, the "hole" phenomenon). The concurrent Raft algorithm designs a log hole array (LHA) to judge whether this log conflicts with the previous N (N≥1) logs to guarantee the correctness of the storage semantics, and then this log can be safely executed.

The LHA is used for judging whether a conflict occurs between this log and the previous target number of logs; in order to guarantee the integrity of the LHA of each log, the log list of the first node device does not allow a hole to exist; the first node device needs to sequentially receive a business request (or a command) sent by the terminal (Client) and records a log corresponding to the business request in the log list; and the above-mentioned strategy guarantees that the LHA of the log sent by the first node device to the second node devices can completely encompass the storage range of this log and the previous N logs. A data structure of the LHA will be described in detail in the following embodiments and will not be described in detail herein.

Compared with the conventional Raft algorithm, in the log structure of the concurrent Raft algorithm, the LHA is added to assist in judging whether this log conflicts with the storage range of the previous N logs. In addition, when the log index LogIndex=−1 (the log index LogIndex is simply referred to as Index), it indicates that this log is missing; and when the log index LogIndex=−2, it indicates that this log is an empty log item, and the empty log item is an invalid log item successfully written.

In one example, the first node device sequentially sends a log x=1 with Index=1 and a log x=2 with Index=2 to any second node device; and the second node device only receives the log with Index=2, and the log with Index=1 is missing. Since a value of x is modified in each of the log with Index=1 and the log with Index=2 both, the two logs are in conflict; and the log with Index=2 cannot be executed immediately and can be executed only after the received log of Index=1 is waited and successfully executed.

Modifying x in the above-mentioned example into the storage range of the log, and the correctness condition of the storage semantics can be obtained, namely: in the storage scenario, the prerequisite that this log can be safely executed is that each log that has not been executed before this log does not conflict with the storage range of this log. In some embodiments, whether a conflict in the storage range occurs between this log and the previous N logs can be judged through the LHA, so that the distributed storage system can highly concurrently execute various logs in the log list out of order while the correctness condition of the storage semantics is guaranteed to be satisfied.

Figure 3:
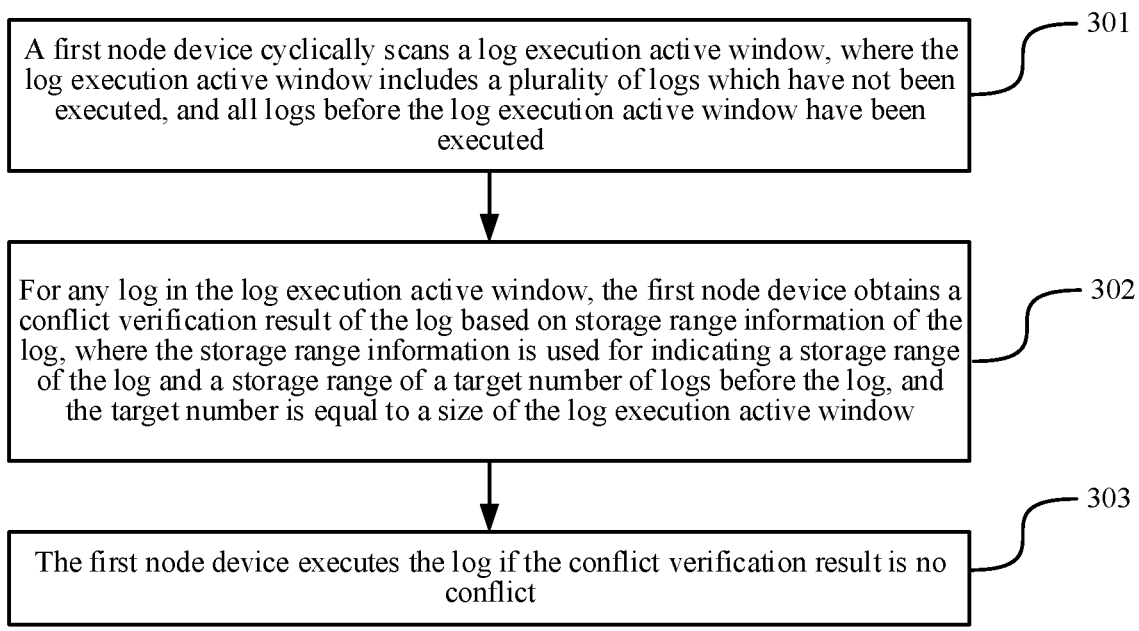
FIG. 3 is a flowchart of a log execution method provided by an embodiment of this application.

FIG. 3 is a flowchart of a log execution method provided by an embodiment of this application. With reference to FIG. 3, this embodiment is executed by the first node device in the above-mentioned distributed storage system; and the embodiment of this application introduces a log out-of-order execution mechanism of a concurrent Raft algorithm, which is described in detail below.

301. The first node device cyclically scans a log execution active window, where the log execution active window includes a plurality of logs which have not been executed, and all logs before the log execution active window have been executed.

Among them, the meaning of the log execution (Apply) active window is: only the logs located in the log execution active window can be executed, but the correctness condition of the storage semantics further needs to be satisfied for execution of the logs: this log does not conflict with the logs which have not been executed before this log in the log execution active window.

In some embodiments, all the logs before the log execution active window have been executed, and only each log in the log execution active window can be executed. In addition, all the logs after the log execution active window cannot be executed; it is necessary to wait for the log execution active window to move backward; and only when a certain log is satisfied within the log execution active window, this log can have the right to be executed.

In some embodiments, the log execution active window involves following two state variables.

The first is a toApplyWindowBeginIndex variable used for recording Index of the first log within the log execution active window; and the second is an is Applied[ ] list used for recording whether each log in the log execution active window has been executed, that is, for recording execution condition information of each log in the log execution active window.

For example, the execution information of each log is represented by Boolean data; if a value of the Boolean data is True, it indicates that this log has been executed; and if the value of the Boolean data is False, it indicates that this log has not been executed. In an is Applied[ ] array, the execution information of various logs is stored in order of the log index from small to large.

In the above-mentioned process, by setting the log execution active window, the storage overhead of the state variables in the concurrent Raft algorithm can be saved; for example, the conventional Raft algorithm needs to record whether each log is committed and executed, while the concurrent Raft algorithm only needs to record the execution state of each log located in the log execution active window on the premise that all the logs before the log execution active window have been executed, so that the storage overhead of the first node device can be saved.

302. For any log in the log execution active window, the first node device obtains a conflict verification result of the log based on storage range information of the log, where the storage range information is used for indicating a storage range of the log and a storage range of a target number of logs before the log, and the target number is equal to a size of the log execution active window.

In some embodiments, after the first node device cyclically scans the log execution active window, with regard to any log which has not been executed in the log execution active window, it is judged whether this log conflicts with a log which is located before the log and has not been executed in the log execution active window, to obtain a conflict verification result of the log.

In some embodiments, the first node device maintains one storage range information for each log, and the storage range information for each log is used for recording the storage range of each log and the storage ranges of the target number of logs before each log.

In some embodiments, the first node device reads the storage range information of the log, and the storage range of the log and the storage ranges of the target number of logs before the log are obtained; in the case that an intersection set between the storage range of the log and the storage ranges of the target number of logs is an empty set, it is determined that a conflict verification result is no conflict; and in the case that the intersection set between the storage range of the log and the storage ranges of the target number of logs is not the empty set, it is determined that the conflict verification result is conflict occurrence.

In some embodiments, the first node device acquires the intersection set between the storage range of the log and the storage range of each log before the log and traverses the target number of logs to obtain a target number of intersection sets; and if any intersection set among the target number of intersection sets is not an empty set, it is determined that the conflict verification result is conflict occurrence. In some embodiments, the number of intersection sets which are not empty sets are acquired, and this number of intersection sets is determined as the number of logs which conflict with this log, so that subsequent deferred execution on the log is facilitated; or otherwise, if all intersection sets in the target number of intersection sets are empty sets, the conflict verification result is determined as no conflict.

In some embodiments, the first node device acquires a union set between the storage ranges of the previous target number of logs, then a target intersection set between the union set and the storage range of this log is acquired; if the target intersection set is an empty set, it is determined that the conflict verification result is no conflict; or otherwise, if the target intersection set is not an empty set, it is determined that the conflict verification result is conflict occurrence.

In some embodiments, the storage range information maintained by the first node device for each log is a log hole array (LHA), and the LHA is used for determining whether a conflict occurs between this log and the previous target number of logs. That is to say, when storing each log, the first node device can additionally store an LHA of each log, where the LHA includes the storage range of this log and the storage ranges of the previous target number of logs; for example, the LHA includes the storage range of this log and the storage ranges of N logs before this log, and N is an integer greater than or equal to 1.

Figure 4:
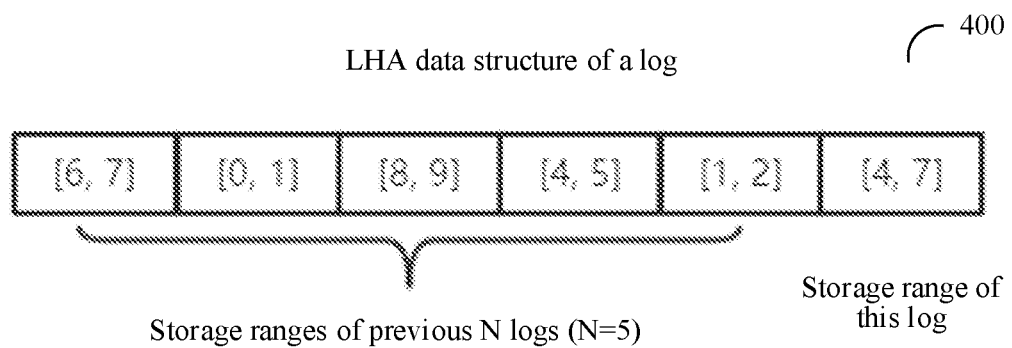
FIG. 4 is a schematic diagram of a principle of an LHA data structure provided by an embodiment of this application.

FIG. 4 is a schematic diagram of a principle of an LHA data structure provided by an embodiment of this application. As shown at 400, the LHA of a certain log includes a storage range [4, 7] of this log self and a storage range of N=5 logs before this log, and the storage ranges of the 5 logs are arranged in the order of the indexes from small to large as follows: [6, 7], [0, 1], [8, 9], [4, 5], [1, 2]. It can be seen that the storage range of this log conflicts with two logs with the storage ranges of [6, 7] and [4, 5].

On the basis of the above, the first node device may determine whether this log conflicts with N logs before this log based on the LHA additionally stored following each log. However, the first node device cannot judge whether this log conflicts with other logs before the above-mentioned N logs based on the LHA; and therefore, the concurrent Raft algorithm needs to guarantee that all the other logs before the above-mentioned N logs have been executed, and it is guaranteed by designing the above-mentioned log execution active window that: a) only logs in the log execution active window are likely to be executed; and b) the size of the log execution active window is exactly equal to N.

By means of the above-mentioned design, when whether a conflict arises is judged based on the LHA for any log in the log execution active window, since the size of the log execution active window is further equal to N, even if the last log in the log execution active window (namely, the log with the largest index in the log execution active window), it can further be guaranteed that other logs before N logs before the above-mentioned last log are executed.

303. The first node device executes the log if the conflict verification result is no conflict.

In some embodiments, the first node device adds the log to the log list ApplyingList [ ]-to-be-executed, calls a log execution thread, and processes the log stored in the log list ApplyingList [ ]-to-be-executed; and since it has been confirmed that the log does not conflict with the previous target number of logs, the log which guarantees the correctness of the storage semantic can be executed out of order without waiting for the previous target number of logs before this log to execute.

The correctness condition of the above-mentioned storage semantics is described in detail below. In the distributed storage system, in order to guarantee that conflicting I/O requests can be executed serially according to a chronological order, and non-conflicting I/O requests can be executed in parallel, it is necessary to judge whether this log is in conflict: 1) whether each log in the log execution active window conflicts with the storage ranges of the previous N logs is recorded through the LHA; 2) all logs before the log execution active window are guaranteed to be executed, and the size of the log execution active window is set as toApplyWindowSize; and 3) whether each log in the log execution active window conflicts with the previous N logs is judged by step 302 described above.

In some embodiments, when processing logs stored in the log list-to-be-executed, the first node device performs the following operations of: writing business data corresponding to the logs stored in the log list ApplyingList [ ]-to-be-executed to the volatile storage medium; adding the logs, corresponding to the business data written to the volatile storage medium, to an executed log list AppliedList [ ]; and in the case that the data stored in the volatile storage medium is greater than or equal to the storage threshold, writing the business data stored in the volatile storage medium to the non-volatile storage medium, where different state parameters are respectively set in the executed log list AppliedList [ ] for logs, of which the corresponding business data is not written to the non-volatile storage medium, and logs, of which the corresponding business data is written to the non-volatile storage medium; and the storage threshold is any numerical value greater than or equal to 0.

In some embodiments, the executed log list AppliedList[ ] is used for recording logs which have been executed, for example, an index LogIndex of each log which has been executed is stored in the executed log list AppliedList[ ], and a state parameter State is used for indicating whether the business data corresponding to the logs is persistent (namely, whether the business data is written to the non-volatile storage medium).

In one example, State=0 indicates that the business data corresponding to the logs is only written to the volatile storage medium and has not been written to the non-volatile storage medium yet; and State=1 indicates that the business data corresponding to the logs has been written to the non-volatile storage medium. In another example, State=1 indicates that the business data corresponding to the logs is only written to the volatile storage medium and has not been written to the non-volatile storage medium yet; and State=0 indicates that the business data corresponding to the logs has been written to the non-volatile storage medium. The embodiments of this application do not specifically define this.

In one embodiment, the volatile storage medium is a data buffer pool built by the storage system using an internal memory; and the non-volatile storage medium is a magnetic disk, hard disk, and the like. In the above-mentioned case, the business data corresponding to the logs is first written to the data buffer pool, and then the system periodically flushes the business data in the data buffer pool to the disk in batch. In some embodiments, when the first node device transfers the business data stored in the data buffer pool to the disk, a Checkpoint technology is adopted; namely, when the data stored in the data buffer pool is greater than or equal to the storage threshold, the system can trigger a Checkpoint event, all dirty data (non-persisted business data) in the data buffer pool back is flushed to the disk, and state parameters of a corresponding log in an executed log list AppliedList [ ] are modified, so that the state parameters of the corresponding log are marked as being flushed back to the disk.

Figure 5:
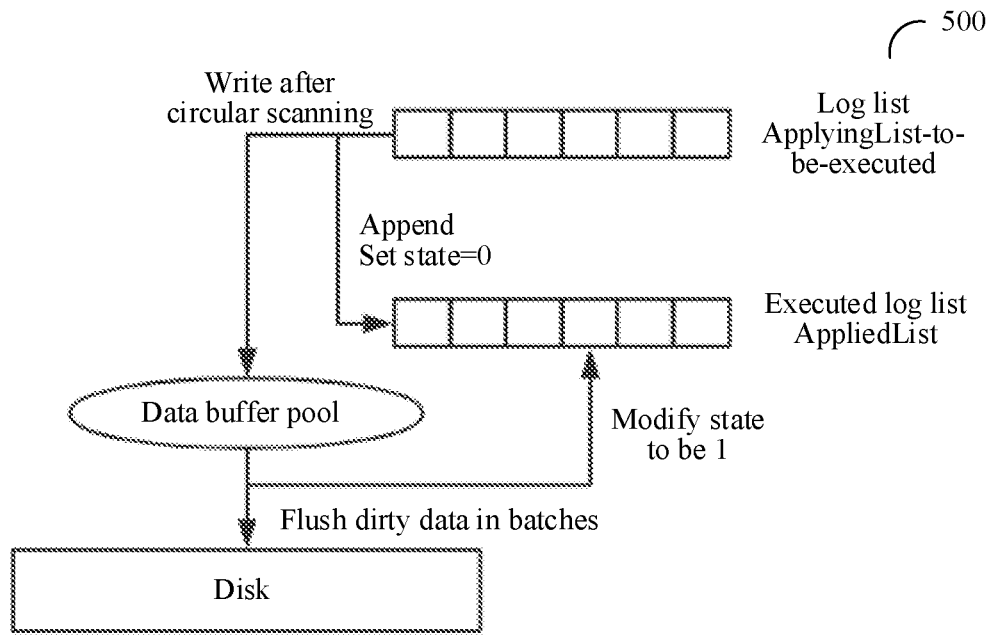
FIG. 5 is a schematic diagram of data persistence mechanism provided by an embodiment of this application.

FIG. 5 is a schematic diagram of data persistence mechanism provided by an embodiment of this application. As shown at 500, with the volatile storage medium as the data buffer pool and the non-volatile storage medium as the disk as an example for illustration, various logs which can be currently executed are recorded in a log list ApplyingList [ ]-to-be-executed; the first node device calls the log execution thread to cyclically scan the log list ApplyingList [ ]-to-be-executed; each business data corresponding to each log in the log list ApplyingList [ ]-to-be-executed is written to the data buffer pool during each scanning, and each log corresponding to each business data written to the data buffer pool is appended to the executed log list AppliedList [ ] at the same time; and a state parameter State=0 of each log mentioned above is set to identify that each business data corresponding to each log is written to the data buffer pool (but not written to the disk). When the data stored in the data buffer pool is greater than or equal to the storage threshold (equivalent to a buffer pool space threshold), each business data in the data buffer pool is transferred to the disk; that is to say, the dirty data in the data buffer pool is flushed back to the disk, and a state parameter State of each log corresponding to each business data in an executed log list AppliedList [ ] is assigned as 1 at the same time.

In the above-mentioned process, by maintaining a state parameter, which is used for indicating whether each business data corresponding to each log has been written to the data buffer pool or to the disk, for each log in the executed log list AppliedList [ ], it can be effectively guaranteed that the missing business data is recovered in time when the system crashes.

Since the business data stored in the volatile storage medium is volatile, if the system crashes, the dirty data which is not flushed to the non-volatile storage medium in the volatile storage medium can be missing; the storage system uses a log mechanism to solve the above-mentioned problem, that is to say, the business data is written to a log before being written to the volatile storage medium; and when the system crashes unexpectedly, the business data can be recovered by redoing the log, the log corresponding to the dirty data which has not been persisted in the volatile storage medium can be recorded using the Checkpoint technology, and all the remaining logs can be recycled.

In view of this, the concurrent Raft algorithm designs a system crash recovery mechanism to guarantee that the written business data cannot be completely missing when the system crashes and is restored through the Checkpoint technology, and then an out-of-order write request is ordered through the data structure of the executed log list AppliedList[ ] to guarantee ordering of the data recovery process, as described below.

In some embodiments, assuming that the distributed storage system crashes at a certain time, the business data written to the non-volatile storage medium can be persistently stored. Therefore, no recovery is needed; however, the business data (belonging to the dirty data) written only to the volatile storage medium rather than to the non-volatile storage medium can be totally missing. Data can be restored in the first node device by the following operations: in the case that a crash event occurs in the distributed storage system, the distributed storage system acquires a plurality of logs-to-be-restored from the executed log list ppliedList [ ] based on the state parameter State when restarting, where business data corresponding to each log-to-be-restored has been written to the volatile storage medium rather than to the non-volatile storage medium; and based on the storage order of the plurality of logs-to-be-restored in the executed log list, a plurality of business data corresponding to the plurality of logs-to-be-restored is restored to the volatile storage medium in sequence; and in other words, the business data corresponding to each log-to-be-restored is restored to the volatile storage medium in sequence based on the storage order of the logs-to-be-restored in the executed log list AppliedList [ ].

In the above-mentioned process, since different state parameters State are respectively set in the executed log list AppliedList [ ] for the logs, of which the business data is not written to the non-volatile storage medium, and a log, of which the business data is written to the non-volatile storage medium, it is assumed that State=0 represents that the business data corresponding to the logs is only written to the volatile storage medium and has not been written to the non-volatile storage medium, and State=1 represents that the business data corresponding to the logs is written to the non-volatile storage medium; when the system restarts after crashing, the first node device checks the executed log list AppliedList [ ] using the Checkpoint technology to acquire a plurality of logs with the state parameter State=0; each log with State=0 is determined as a log-to-be-restored; business data corresponding to the logs with State=0 (namely, logs-to-be-restored) are all merely flushed to the volatile storage medium rather than flushed back to the non-volatile storage medium; and the business data can be missing from the volatile storage medium during the crash. Therefore, it is necessary to recover these missing business data (dirty data) by Redo Log.

In some embodiments, the first node device sequentially scans the executed log list AppliedList[ ], and sequentially executes the logs-to-be-restored (the logs with State=0), of which the business data has not been persisted in the executed log list AppliedList[ ], so that the business data corresponding to the logs-to-be-restored can be sequentially restored to the volatile storage medium by redoing the logs-to-be-restored.

In the above-mentioned process, since the executed log list AppliedList[ ] saves the execution order of logs, each log-to-be-restored is executed sequentially in this order; it can be guaranteed that the log-to-be-restored to be executed and the logs in conflict with the previous storage ranges (including the log-to-be-restored or the persisted log) have been executed, so that the correctness of the storage semantics can be guaranteed.

In some embodiments, the above-mentioned executed log list AppliedList[ ] only saves an index and a state parameter State of each executed log and does not save a specific log record; and a corresponding log record can be queried in the log list by means of the index, so that the storage overhead of the executed log list AppliedList [ ] can be saved.

The above-mentioned step 303 shows how to execute this log and perform a persistence operation on the corresponding business data when this log has no conflict with the previous target number of logs and further provides a crash recovery mechanism of the system; while in other embodiments, when this log conflicts with the previous target number of logs, the first node device performs the following operations of: in the case that the conflict verification result is conflict occurrence, acquiring the number of logs which conflict with this log; determining a scanning frequency for the log based on the number of logs; and scanning the log based on the scanning frequency, refreshing the conflict verification result until the conflict verification result is no conflict, and executing the log.

In some embodiments, the first node device determines the scan frequency as the first frequency if the number of logs is greater than a conflict threshold; or in the case that the number of logs is less than or equal to the conflict threshold, the scanning frequency is determined as a second frequency, where the second frequency is greater than the first frequency.

In the above-mentioned process, the first node device determines the scanning frequency of this log based on the number of logs in conflict with this log; if the number of logs in conflict is relatively large, it takes a relatively long time to wait for conflict resolution, and therefore, scanning is performed at a low first frequency; and if the number of logs in conflict is relatively small, it takes a relatively short time to wait for conflict resolution, and therefore, scanning is performed at a high second frequency.

In some embodiments, the first node device adds the log to a log list corresponding to the scanning frequency and scans logs stored in the log list based on the scanning frequency. That is to say, the first node device maintains different log lists for different scanning frequencies; and by circularly scanning the corresponding log lists according to the corresponding scanning frequencies, different scanning frequencies can be flexibly selected based on the number of logs in conflict, and thus computing resources of the system are saved.

In some embodiments, the above-mentioned log lists are divided into two categories: a first log list SlowScanList[ ] and a second log list FastScanList[ ]; a scanning frequency of the first log list SlowScanList[ ] is a first frequency, and a scanning frequency of the second log list FastScanList[ ] is a second frequency; and since the second frequency is greater than the first frequency, that is, the scanning frequency of the first node device for the second log list FastScanList[ ] is greater than the scanning frequency of the first log list SlowScanList[ ].

In some embodiments, after an administrator sets a conflict threshold ScanListThreshold, the number of logs in conflict with this log within this log execution active window is acquired; when the number of logs is greater than the conflict threshold ScanListThreshold, this log is added to the first log list SlowScanList [ ]; or otherwise, when the number of logs is less than or equal to the conflict threshold ScanListThreshold, this log is added to the second log list FastScanList [ ].

On the basis of the above, since the number of conflicting logs in the second log list FastScanList [ ] is small, there is a greater probability that the conflict is resolved preferentially; and the second log list FastScanList [ ] is scanned frequently, and the conflict-resolved logs can be found and executed in time. Therefore, avoid the situation that the execution flow of subsequent other logs conflicting with this log is delayed for a long time due to blockage of this log is avoided.

On the basis of the above, since the number of conflicting logs in the first log list SlowScanList[ ] is large, there is a greater probability that all the conflicts can be resolved only after waiting for a long time; and the first log list SlowScanList[ ] is scanned at a low frequency, so that the logs in the first log list SlowScanList[ ] can be successfully committed in the premise of greatly saving the computing resources.

In some embodiments, in the first log list SlowScanList[ ] and the second log list FastScanList[ ], an index of this log is stored, and an index of each conflicting log that conflicts with this log is further stored. Therefore, by circularly scanning the first log list SlowScanList[ ] and the second log list FastScanList[ ], a conflict-free log can be found in time, removed from the first log list SlowScanList[ ] or the second log list FastScanList[ ] and added to the log list ApplyingList[ ]-to-be-executed.

In some embodiments, for a log with a conflict verification result being conflict occurrence, the first node device adds this log to the same log list ScanList[ ] to wait for the conflict to be resolved and then executes this log. Therefore, it is guaranteed that the problem of data inconsistency cannot be caused during execution of this log, and the processing flow of log execution can be simplified without maintaining two different log lists.

In some embodiments, the first node device adds this log to a log list corresponding to a value interval according to a value interval where the number of conflicting logs is located, where the number of value intervals is greater than or equal to 2; each value interval corresponds to a log list; each log list corresponds to a scanning frequency; the log lists corresponding to different value intervals have different scanning frequencies; and with the increase of each value interval, the scanning frequency of the corresponding log list decreases accordingly. Therefore, more levels of scanning frequencies can be refined, and a more perfect scanning flow is constructed.

In the embodiments of this application, the conditions, under which any log in the concurrent Raft algorithm can be executed, are as follows: (a) this log is located in the log execution active window, and the first N logs of this log are guaranteed to be executed; and (b) this log is acknowledged to have no conflict with the storage ranges of the previous N logs by checking the LHA of this log.

Figure 6:
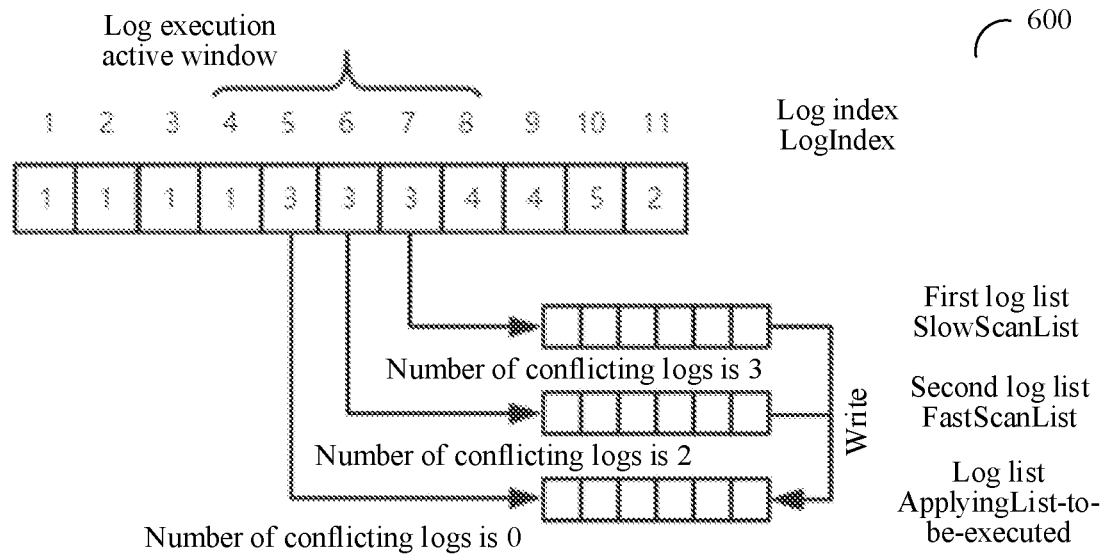
FIG. 6 is a schematic diagram of a principle of a log out-of-order execution scheduling provided by an embodiment of this application.

FIG. 6 is a schematic diagram of a principle of a log out-of-order execution scheduling provided by an embodiment of this application. As shown at 600, assuming that an index range of the log execution active window of the first node device at a certain time is [4, 8], the number of logs, which conflict with logs with indices of 5, 6 and 7 (that is, an intersection set of storage ranges of two logs is not an empty set), in the log execution active window are 0, 2 and 3 respectively; and assuming that a conflict threshold ScanListThreshold is 2, for a log with Index=5, since the number of conflicting logs is 0, it is indicated that there is no conflict, and this log is directly added to the log list ApplyingList[ ]-to-be-executed; for a log with Index=6, since the number of conflicting logs of 2 is just equal to the conflict threshold ScanListThreshold, it is indicated that there are less conflicting logs, and then this log is added to the second log list FastScanList [ ]; and for a log with Index=7, since the number of conflicting logs of 3 is greater than the conflict threshold ScanListThreshold, it is indicated that there are more conflicting logs, and then this log is added to the first log list SlowScanList[ ]. It is to be noted that when the first log list SlowScanList [ ] or the second log list FastScanList [ ] is circularly scanned, once any log is found to satisfy the correctness condition of the storage semantics, the above-mentioned log is removed from the first log list SlowScanList [ ] or the second log list FastScanList [ ] and added to the log list ApplyingList [ ] to-be-executed, waiting for the log execution thread for processing accordingly.

All optional technical solutions described above can be combined in any way to form optional embodiments of the present disclosure, which will not be described in detail herein.

In the method provided by the embodiments of this application, by setting the log execution active window and guaranteeing that all the logs before the log execution active window have been executed, it only needs to verify whether any log in the log execution active window conflicts with the storage ranges of the logs which are located in the log execution active window and before the log and are not executed, and then whether the log will cause the data inconsistency problem in the entire distributed storage system can be known; and with regard to the conflict-free log, it is supported to execute the log out of order without blocking an execution process of the log and waiting for the logs which are located in the log execution active window and before the log and are not executed are executed completely. Therefore, the throughput of the distributed storage system can be increased, and the method can be applied to high concurrency scenarios.

In the following, state variables related to the execution flow and stored on all node devices in the distributed storage system and state variables stored only on the first node device in the concurrent Raft algorithm are shown, and the description is made below:

```
/**
Apply-related state variables stored on all node devices
*/
//log apply active window size
int toApplyWindowSize
//index of first log in apply window
int toApplyWindowBeginindex
//Whether logs in log apply active window are applied is recorded
bool isApplied[toApplyWindowSize]
//this Pending List is added when the number of logs conflicting with the log in its LHA is less the
conflict threshold set by the user
//Log conflicting with a small number of logs have a greater probability of satisfying the apply
condition first, so this list is scanned frequently to find logs capable of apply
PendingList fastScanPList
//This Pending List is added when the number of logs conflicting with the log in its LHA is greater than
the conflict threshold set by the user
//The probability that the log conflicting with a large number of logs first satisfies the apply condition
is small, so the list is scanned at a low frequent to find logs capable of apply
PendingList slowScanPList
```

```
//LHA conflicting log number threshold (namely, conflict threshold)
int scanListThreshold
//Index of a log capable of apply is recorded
int applyingList[ ]
//Index of a log which has been applied is recorded
Log appliedList[ ]
/**
Only state variables stored on the first node device
*/
//The logs before the index is beginindex [i] on the second node device with id of i are all matched
with
the logs with the same index on the first node device
int beginindex[ ]
//Record whether the log in each node is matched with the log with the same index on the first node
device
//matchindex i j records whether the log with index of beginindex [i]+j on the second node device with
the id of i is matched with the log with the same index on the first node device
bool matchindex[ ][ ]
```

In the above-mentioned embodiments, the out-of-order log execution mechanism of the concurrent Raft algorithm is introduced in detail. For the conventional Raft algorithm, since all the logs are executed in a strict order, all the copies can further guarantee the data consistency. However, for the concurrent Raft algorithm, due to the out-of-order acknowledgment and out-of-order commitment, the log copies of various log can appear missing in the log lists of different second node devices. By allowing out-of-order execution only for the logs with the correctness condition of the storage semantics, the data consistency of the entire distributed storage system can be guaranteed when the data is executed concurrently in out-of-order.

The premise of any log being able to execute out of order is that the correctness condition of the storage semantics needs to be satisfied (this log has no conflict with the previous N unexecuted logs), and an LHA data structure is introduced to quickly judge whether this log conflicts with the previous N logs. In addition, the log execution active window is introduced to save an execution state of each log and manage the execution flow; the log out-of-order execution mechanism can solve the execution order and the execution time of a series of logs which may conflict with each other; and the above-mentioned management and control may be achieved by setting different log lists corresponding to different scanning frequencies.

However, in the embodiments of this application, the log out-of-order committing mechanism of the concurrent Raft algorithm will be introduced; and similarly, a log committing (Commit) active window is set. With regard to the first node device, only logs in the log committing active window can be sent to the second node devices; with regard to the second node devices, only logs in the log committing active window can be received from the first node device; and in addition, it is also required that all logs before the log committing active window have been committed.

In some embodiments, setting the size of the log committing active window as toCommitWindowSize, the relevant data structure of the log committing active window includes the following contents:

(1) CommitIndex represents the maximum index in the consecutive committed logs on this node device and is used for indicating that the log with an index of CommitIndex on this node device and all the previous logs have been committed.

(2) isCommited[ ] is used for recording committing condition information of each log in the log committing active window, namely, used for recording whether each log in the log committing active window has been committed, where each log with Index in an interval [CommitIndex+1, CommitIndex+toCommitWindowSize+1] belongs to the log committing active window.

(3) Let x=CommitIndex+toCommitWindowSize+1; for the first node device, only the log with Index≤x can be sent to the second node devices and committed; and for the second node devices, only the log with Index≤x can be received, and the ACK message can be returned.

It is to be noted that the log committing active windows of the first node device and any second node device are the same or different, and the log committing active windows of different second node devices are the same or different. The embodiments of this application do not specifically define this.

Figure 7:
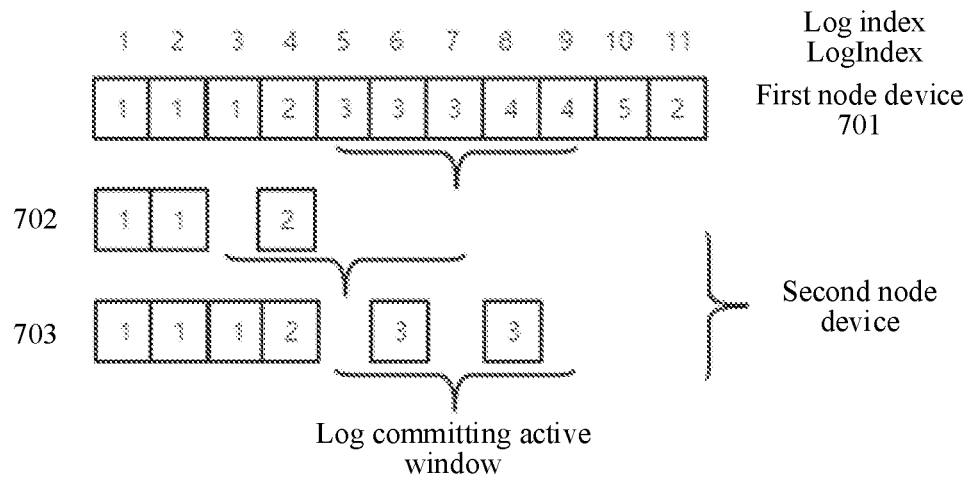
FIG. 7 is a schematic diagram of a data structure of a log committing active window provided by an embodiment of this application.

FIG. 7 is a schematic diagram of a data structure of a log committing active window provided by an embodiment of this application. As shown in FIG. 7, the log committing active window of the first node device 701 is [5, 9]; and it indicates that logs with Index<5 have been successfully committed, logs with 5≤Index≤9 can be sent to the second node devices, and logs with Index>9 cannot be sent. The log committing active window of the second node device 702 is [3, 7]. It indicates that logs with Index<3 have been successfully committed; logs with 3≤Index≤7 can be received, the ACK message is returned; and logs with Index>7 cannot be received (namely, refused to be received); and in the log committing active window [3, 7], logs with Index of 3, 5, 6 and 7 have not been received yet. Similarly, the log committing active window of the second node device 703 is [5, 9], indicating that logs with Index<5 have been successfully committed; logs with 5≤Index≤9 can be received, and the ACK message is returned; logs with Index>9 cannot be received (namely, refused to be received); and in the log committing active window [5, 9], logs with Index of 5, 7 and 9 have not been received yet.

On one hand, log flow control can be performed by setting the log committing active window, so that management on the rate at which the first node device sends the logs to the second node devices is facilitated, and it is guaranteed that the second node device receiving the logs does not overload; and meanwhile, the logs located in the log committing active window on each second node device support concurrent and out-of-order reception (the reception here refers to ACK message return), so that the log transmission efficiency is improved.

On the other hand, the storage overhead of the state variables of the concurrent Raft algorithm can be saved by setting the log committing active window (such as the overhead caused by recording whether the log has been committed, executed and the like); since it is guaranteed that all the logs before the log committing active window have been committed, it is only necessary to record the committing situation information of each log in the log committing active window, so that the storage overhead is greatly saved.

In some embodiments, after being elected from a distributed storage cluster, a first node device (Leader, leader node) may receive a business request from the terminal (Client); after receiving the business request from the terminal, the first node device executes a database transaction requested by the business request to obtain business data requested by the business request, and a log corresponding to the business data is appended to the log list. Then, a term parameter Term of the log is set as Term of the first node device self. Assuming that the number of original last log in the log list is i, the number of newly appended log (referred to as a new log for short) is set as i+1, and the index log [i+1]. LogIndex=log [i]. LogIndex+1 of the $(i+1)^{th}$ log is set. Then, an LHA of the $i^{th}$ log is copied, the first element of the LHA is removed, and the storage range of the new business request (also called a new command) is appended to the LHA as the last element of the LHA, to obtain the LHA of the $(i+1)^{th}$ log, where the storage ranges of the $(i+1)^{th}$ log and the previous N logs are contained.

After the first node device writes the new log to the log list, the new log can be sent to each second node device concurrently via an AppendEntriesRPC message, where the English language of RPC is fully referred to as Remote Procedure Call Protocol, and the Chinese language is fully referred to as a remote procedure call protocol. After receiving the AppendEntriesRPC message, each second node device immediately adds the new log to the corresponding position in its own log list and can immediately return an ACK message of the new log to the first node device without waiting for ACK of the previous logs. In some embodiments, the first node device sends logs to each second node device in batches, so that the communication overhead of the system can be saved.

In some embodiments, a range of log indexes which can be sent in a log list of the first node device is defined, so that the rate at which the first node device sends the logs to each second node device can be conveniently managed, and overload of each second node device is avoided. In some embodiments, the maximum Index of the log that can be sent is commitIndex+toCommitWindowSize.

Figure 8:
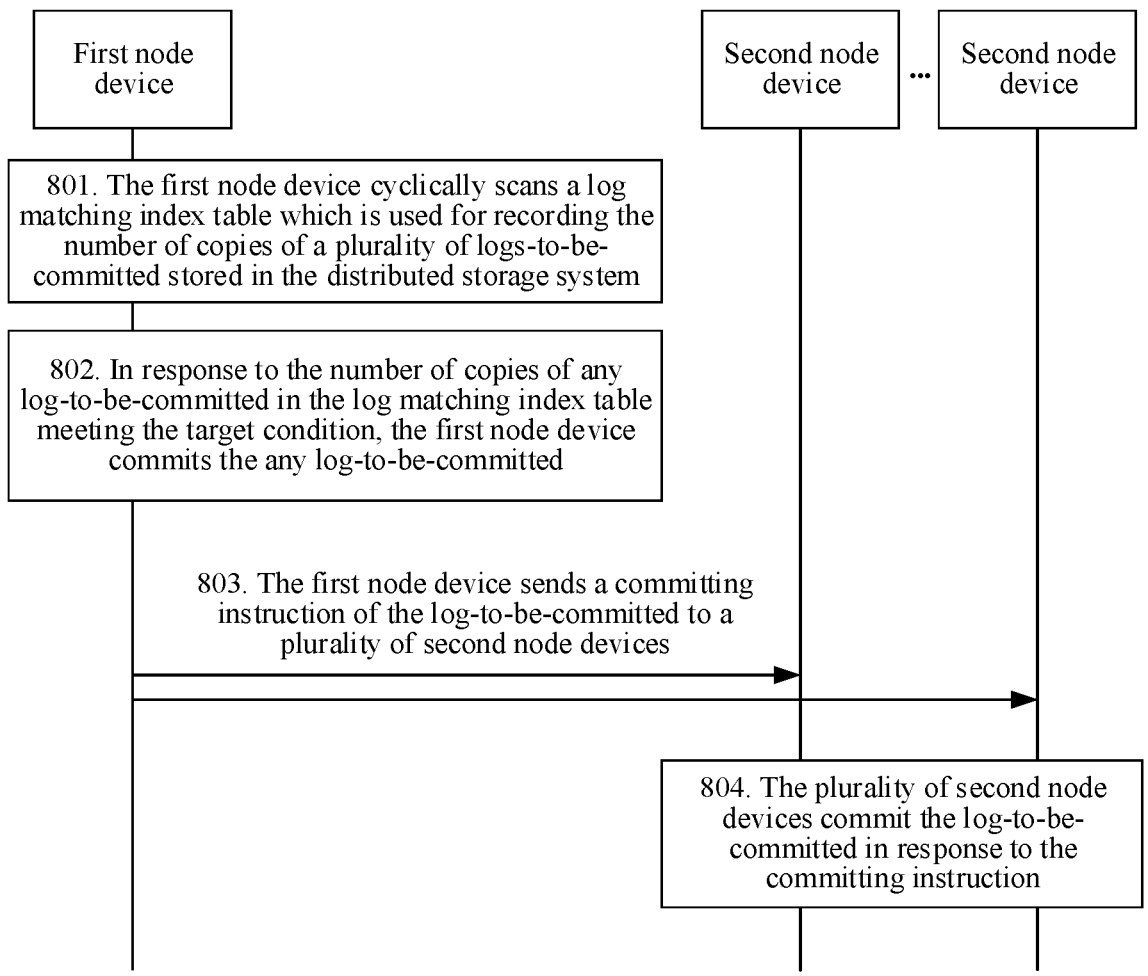
FIG. 8 is a flowchart of a log out-of-order committing mechanism provided by an embodiment of this application.

FIG. 8 is a flowchart of a log out-of-order committing mechanism provided by an embodiment of this application. With reference to FIG. 8, the following describes a log out-of-order committing mechanism based on a log committing active window; this log out-of-order committing mechanism is applicable to a distributed storage system; and the distributed storage system includes a first node device (Leader, leader node) and a plurality of second node devices (Follower, follow node), which are described in detail below.

801. The first node device cyclically scans a log matching index table which is used for recording the number of copies of a plurality of logs-to-be-committed stored in the distributed storage system, where the log matching index table matchIndex[ ][ ] is of a two-dimensional sequential table structure for performing statistics on log reception conditions.

The first node device needs to know which logs have been received and which logs have not been received by each second node device in addition to need to define the log index range that can be sent, so that macro-scheduling on log replication work for the entire distributed storage system can be facilitated.

In some embodiments, the first node device records which log items have been received by each second node device through the log matching index tables matchIndex[ ][ ] and beginIndex[ ]. Let a node identification of any second node device be i, then beginIndex [i] represents that each log with the index of the log in the log list of the $i^{th}$ second node device being less than beginIndex [i] has been received by the $i^{th}$ second node device; and matchIndex [i] [j] represents whether a log item with the index of the log in the log list of the first node device being beginIndex [i]+j has been received by the $i^{th}$ second node device, where i≥1, j≥1.

In the above-mentioned process, although matchIndex[ ][ ] is of the two-dimensional sequential table structure, each element in the two-dimensional sequential table is Boolean data occupying only one bit, namely, for the $i^{th}$ second node device, it is only required to save whether a log with Index being greater than or equal to beginIndex i is received, so that the storage overhead of matchIndex[ ][ ] is very small.

In some embodiments, the first node device circularly scans the log matching index table matchIndex[ ][ ], and judges whether the log with the Index of the $i^{th}$ second node device being beginIndex [i]+j is received based on the log matching index table matchIndex [i] [j]; and if not received (a value of the Boolean data is False), the first node device calls the AppendEntriesRPC message to send the log with the Index being beginIndex [i]+j to the $i^{th}$ second node device.

In some embodiments, with regard to an $i^{th}$ second node device, the AppendEntriesRPC message is received and parsed to obtain a log with Index=beginIndex [i]+j; and the Term of the first node device and the Term of the above-mentioned log with Index=beginIndex [i]+j are read; and in the case that the Term of the first node device is greater than or equal to the Term of the $i^{th}$ second node device itself, and the Term of the log with Index=beginIndex [i]+j is not equal to the Term of the corresponding log with the same index on the $i^{th}$ second node device (or the corresponding log with the same index is missing on the $i^{th}$ second node device), the $i^{th}$ second node device receives the log with Index=beginIndex [i]+j, writes the log with Index=beginIndex [i]+j to a log list thereof and returns an ACK message to the first node device.

In some embodiments, the $i^{th}$ second node device is divided into two cases when receiving a log. The first case is that the Term of the received log with Index=beginIndex [i]+j is not equal to the Term of the corresponding log with the same index on the $i^{th}$ second node device, indicating that the log originally stored on the $i^{th}$ second node device is wrong (or has failed); and it only needs to overwrite the wrong log, and the latest log is stored, so that the log with Index=beginIndex [i]+j can be guaranteed to be consistent with the first node device. The second case is that the corresponding log with the same index is missing on the $i^{th}$ second node device, and the missing log with Index=beginIndex i+j can be completed directly in the log list.

In some embodiments, for the $i^{th}$ second node device, after the Term of the first node device and the Term of the log with Index=beginIndex i+j are read, in the case that the Term of the first node device is less than the Term of the $i^{th}$ second node device itself, the log with Index=beginIndex i+j is rejected, and a failure message is returned to the first node device (for example, a series of error codes is returned).

In the above-mentioned process, with regard to the $i^{th}$ second node device, in response to the AppendEntriesRPC message sent by the first node device, assuming that the Term of the log with Index=beginIndex [i]+j sent by the first node device is k, if the Term of the first node device is greater than or equal to the Term of the $i^{th}$ second node device itself, and the Term of the log with Index=beginIndex [i]+j in the log list of the $i^{th}$ second node device itself is not equal to k (or the log of the Index=beginIndex [i]+j is missing), the received log with Index=beginIndex [i]+j is inserted into the position where the Index is beginIndex [i]+j in the log list itself, and an ACK message is returned; or otherwise, if the Term of the first node device is less than the Term of the $i^{th}$ second node device itself, the log with Index=beginIndex i+j is rejected, and the failure message is returned.

In some embodiments, after the first node device receives the ACK message returned by the $i^{th}$ second node device with respect to the log with Index=beginIndex[i], representing that the $i^{th}$ second node device has received the log with Index=beginIndex[i], the first node device removes the first element of matchIndex[i][ ] and adds 1 to beginIndex[i] (executing a one auto-increment operation).

802. In response to the number of copies of any log-to-be-committed in the log matching index table meeting the target condition, the first node device commits the any log-to-be-committed.

In other words, the first stage, in the case that the number of copies of any log-to-be-committed in the log matching index table meets the target condition, the device commits the log-to-be-committed.

In some embodiments, the target condition is that the proportion of the number of copies of the log-to-be-committed in the number of nodes of the distributed storage system exceeds a proportion threshold, for example, the proportion threshold is ½, that is, the target condition means that the log-to-be-committed has log copies in more than half of the second node devices. Of course, the proportion threshold is any value greater than or equal to 0 and less than or equal to 1, which is not limited in the embodiments of this application; for example, the proportion threshold is ⅔.

In some embodiments, the target condition is that the number of copies of the log-to-be-committed is greater than a copy threshold; and the copy threshold is any integer greater than or equal to 0 and less than or equal to the number of nodes of the distributed storage system, for example, in a distributed storage system containing 99 node devices, the copy threshold is set as 50, which is not specifically limited in the embodiments of this application.

In one embodiment, with the target condition that the proportion of the number of copies of the log-to-be-committed in the number of nodes of the distributed storage system exceeds the proportion threshold as an example for illustration, the first node device can learn whether any log-to-be-committed stores log copies in more than half of the second node devices by circularly scanning matchIndex [ ] [ ]; and if more than half of the second node devices store the log copies, the first node device can choose to commit the log-to-be-committed.

In some embodiments, the first node device circularly scans the log matching index table matchIndex[ ][ ] to determine whether any log-to-be-committed has the log copies in more than half of the second node devices; and assuming that Index of the log-to-be-committed is equal to i, if there are the copies of the log with Index=i in more than half of the second node devices, the first node device modifies isCommited[i-commitIndex] to True for marking that the log-to-be-committed has been committed. Further, if the first element of isCommited[ ] is True, the first node device removes the first element of isCommited[ ] and adds 1 to commitIndex (performing a one auto-increment operation).

803. The first node device sends a committing instruction of the log-to-be-committed to a plurality of second node devices.

In some embodiments, the first node device informs each second node device that the log-to-be-committed has committed itself via an AppendEntriesRPC message.

804. The plurality of second node devices commit the log-to-be-committed in response to the committing instruction.

In some embodiments, for any second node device, after the AppendEntriesRPC message is received, if the second node device has stored the log-to-be-committed indicated by the AppendEntriesRPC message, and the log-to-be-committed has already been committed by the first node device, the second node device can commit the log-to-be-committed.

In some embodiments, according to the AppendEntriesRPC message, the second node device can learn the Term and the Index of the log-to-be-committed which has been committed by the first node device; assuming that, for the log-to-be-committed, the Term=T and the Index=i, the second node device checks a log list; and if there is a log with Term=T and Index=i in the log list (indicating that the locally stored log is the same log as the log committed by the first node device), the second node device also commits the log-to-be-committed, namely, modifies the element of the Index=i in its own isCommited [ ] to be True.

In general, the logs of the first node device and each second node device can be kept consistent, and theoretically, the consistency check of the AppendEntriesRPC message can never fail; however, if a crash event occurs in the first node device, the logs of the first node device and each second node device can be inconsistent, that is to say, the old first node device may not have access to copy all the logs in the log list to other second node devices, and the crash event occurs; and when restarting after a crash, the system has elected a next first node device (Leader), and this inconsistency may cause a series of first node devices and second node devices to crash. Therefore, the above-mentioned log inconsistency problem needs to be solved.

Figure 9:
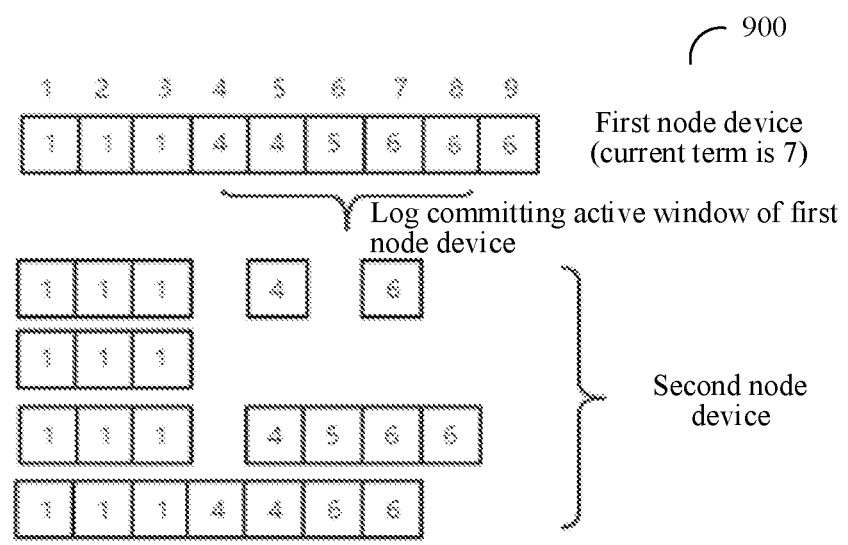
FIG. 9 is a schematic diagram of a principle of a log inconsistent condition provided by an embodiment of this application.

FIG. 9 is a schematic diagram of a principle of a log inconsistent condition provided by an embodiment of this application. As shown at 900, the second node devices may lack logs stored in the first node device, may have an additional log that does not exist on the first node device, or may lack the logs stored in the first node device and further have the additional log that does not exist on the first node device. Missing or unrelated logs in the log list may span a plurality of Terms. In the conventional Raft algorithm, the first node device solves the inconsistency problem by forcing the second node devices to copy its own logs, which means that conflicting logs (inconsistent logs) in the log list of the second node devices can be overwritten by corresponding logs in the log list of the first node device.

In some embodiments, in order to make the logs on the second node devices consistent with the logs on the first node device, all the logs, which are identical in Index and Term, in the log lists of the first node device and the second node device need to keep consistent; all the logs, which are inconsistent with those in the log list of the first node device, in the log list of the second node devices can be deleted; and corresponding logs are resent by the first node device to overwrite the log locations with the same Index in the log lists of the second node devices. The above-mentioned operations all occur when consistency check is performed in response to the AppendEntriesRPC message.

In some embodiments, when each first node device first takes office (that is, being elected as Leader by votes), the first node device can ask each second node device whether its own commitIndex and all logs-to-be-committed in the log committing active window have already been committed by each second node device; and this process is completed in an election Merge recovery phase which will be described in the next embodiment and will not be described in detail herein.

In addition, the first node device maintains data structures matchIndex[ ][ ] and beginIndex[ ], and whether each log is consistent with a log with a corresponding index in a log list of each second node device can be recorded by means of the data structures, so that all committed logs in the first node device and the second node devices are guaranteed to be consistent.

In one embodiment, still with the $i^{th}$ second node device as an example, assuming that the commitIndex of the $i^{th}$ second node device is cIndex, and the committing condition information of each log-to-be-committed in the log committing active window of the $i^{th}$ second node device is stored in isCommitted [ ], it can be known that beginIndex [i] of the $i^{th}$ second node device=cIndex+1. In addition, matchIndex [i][j] represents whether the logs with Index=beginIndex [i]+j in the log lists of the first node device and the $i^{th}$ second node device are consistent. In addition, isCommitted[k] represents whether the log with Index cIndex+k+1 in the log list of the $i^{th}$ second node device is committed, and then let matchIndex[i][j]=isCommitted[beginIndex[i]+j-cIndex-1].

Further, the first node device can know whether the logs in the log lists of the first node device and each second node device are consistent according to matchIndex[ ][ ] and beginIndex[ ] and then sends the inconsistent logs in the log list to each second node device; and this process is completed through the AppendEntriesRPC message. If the logs in each second node device are inconsistent with those in the first node device, the logs in the first node device can overwrite the inconsistent logs in the second node device.

In the above-mentioned embodiment, in order to guarantee the integrity of the LHA in each log item, the log list of the first node device has to be complete; however, due to a decentralized design, the first node device has a time limit, that is to say, after the end of the term of each of the first node devices, a next first node device can be elected by the entire distributed storage system by votes, and then missing the log list of the next first node device may be caused due to the log out-of-order replication mechanism; and through the election merge recovery mechanism provided by the embodiment of this application, the logs missing in its own log committing active window can be completed, and services are provided to a cluster after completion.

The election mechanism of the first node device will be described below.

The election mechanism of the first node device, also referred to as a Leader election mechanism, is used for guaranteeing the order consistency, and only the first node device can respond to the business request from the terminal and sends the business request to each second node device. The distributed storage system includes a first node device and a plurality of second node devices; and based on the majority principle, the number of nodes of all the second node devices is an odd number, for example, 5 is a typical optional number of nodes and allows the system to tolerate a failure of two node devices.

At any time, each node device is in one of three states: Leader node (Leader), follow node (Follower) or candidate node (Candidate). The situation of the various states is as follows.

1. The leader node (Leader) (namely, the first node device): which is responsible for processing all business requests from the terminal.

2. The follow node Follower (namely, a second node device): which cannot set any request but simply respond to a request from the leader node (Leader) or the candidate node (Candidate).

3. The candidate node (Candidate) (called candidate node device): candidates, during the election period, election campaign is performed between the candidate nodes (Candidate) to elect a new leader node (Leader).

Figure 10:
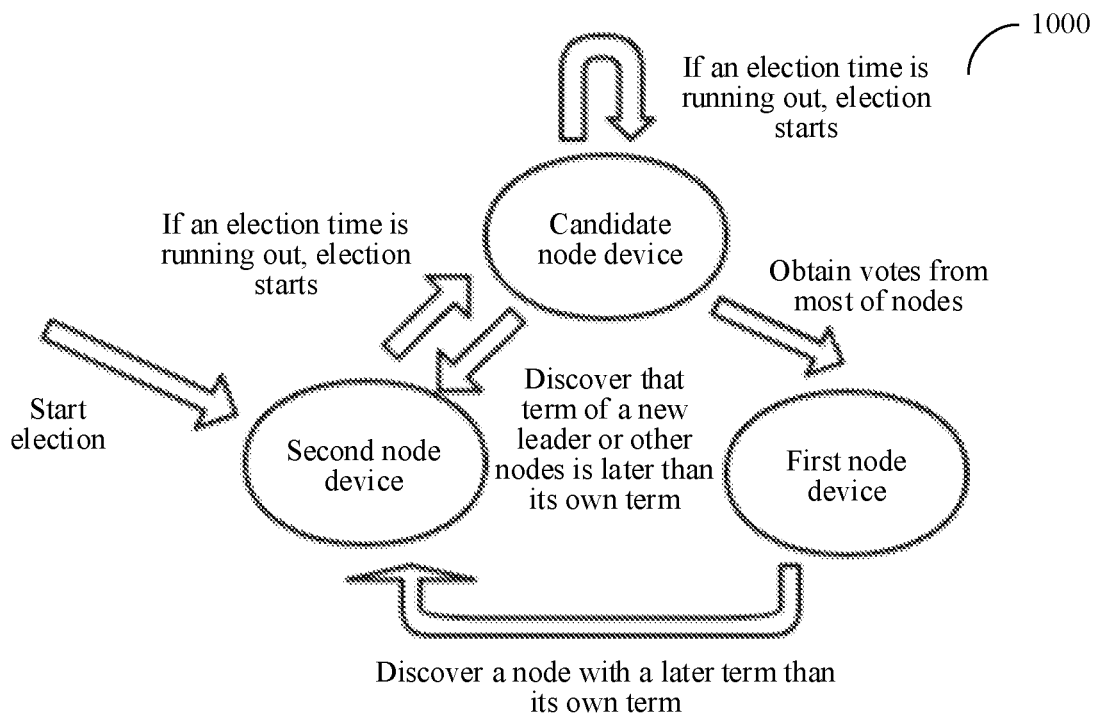
FIG. 10 is a schematic diagram of a principle of an election mechanism for a leader node provided by an embodiment of this application.

FIG. 10 is a schematic diagram of a principle of an election mechanism for a leader node provided by an embodiment of this application. As shown at 1000, a time is divided into Term with an arbitrary time length, where Term is represented by consecutive integers; each Term starts from an election phase; and one or more candidate nodes (Candidate) in the system try to become the leader node (Leader). In some cases, election can result in a split vote, that is, no candidate node (Candidate) gets more than half the votes. In this case, the Term can end with no Leader, and the election phase of a next new Term starts at the same time.

Figure 11:
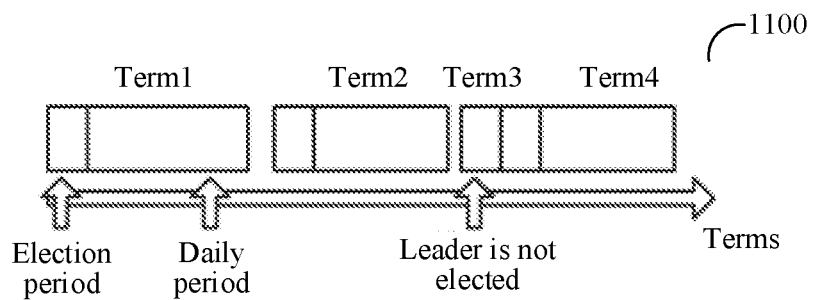
FIG. 11 is a schematic diagram of a principle of Term provided by an embodiment of this application.

FIG. 11 is a schematic diagram of a principle of Term provided by an embodiment of this application. As shown at 1100, Term3 generates split votes during an election period and thus does not have a daily period and, the Term directly enters the election period of Term4.

In some embodiments, each follow node Follower only responds to requests from other nodes, including the leader node (Leader) or the candidate node (Candidate). If not receiving any communication, the follow node (Follower) can become the candidate node (Candidate) and initiates election. A candidate voted from most clusters can become a new leader. A single leader can manage the clusters until the end of the term.

In some embodiments, each node device stores a current Term number, and the Term number increasing monotonically over time. When communication occurs between different node devices, respective current Terms can be exchanged at the same time. If the current Term of one node device is less than the current Term of another node device, the node device updates its own current Term to a maximum value therebetween.

If discovering that its current Term has expired when the current Term is exchanged during a certain communication, the candidate node (Candidate) or the leader node (Leader) immediately becomes the follow node (Follower). If receiving a request with an expired Term, any node device can reject the request.

A remote procedure call (RPC) protocol is used for performing communication between the node devices in the distributed storage system; and if a certain node device does not receive responses from other node devices in time, corresponding RPC messages can be re-initiated, and these RPC messages are sent out in parallel to obtain the optimal performance of the system.

In some embodiments, the first node device of a current term results from voting by a plurality of second node devices in the distributed storage system after the end of a last term; the maximum index commitIndex in consecutive committed logs in the first node device is greater than or equal to the maximum index commitIndex in consecutive committed logs in the plurality of second node devices.

That is, by adding limitations on the election conditions of the first node device, only a candidate node device having consecutive committed logs of all node devices can be elected as the first node device; and therefore, the time consumption of the election merge recovery phase can be greatly saved. It is to be noted that the election conditions allow missing logs in the log committing active window, and these missing logs are restored during the election merge restore phase.

In some embodiments, the election condition for the first node device is limited by a RequestVoteRPC message; and the current second node device refuses to vote for the candidate node device if the commitIndex of the candidate node device (representing the logs with the largest Index in the consecutive committed logs) is less than the commitIndex of the current second node device.

Based on the limitations of the election conditions described above, it is guaranteed that the next first node device has consecutive committed logs of all node devices; however, there is no guarantee that there would be no misses in the log committing active window of the next first node device. For the case that the first node device only misses logs in the log committing active window self, the missing logs are divided into the following two categories: (A) the missing logs have been committed; and (B) the missing logs have not yet been committed, but may exist on other second node devices.

The above-mentioned missing logs of category (A) have been committed, indicating that the missing logs have been consistent on most second node devices; and therefore, the first node device can safely request the missing logs from other second node devices having the missing log and then receive and store the missing log of category (A).

The above-mentioned missing logs of category (B) have not been committed and thus may be expired and unsafe logs; the first node device cannot receive the missing logs of category (B); and the first node device chooses to re-request the missing logs of category (B) from the terminal to complete the missing logs of category (B).

In some embodiments, in the election merge recovery phase, in response to missing at least one log in the log committing active window, the first node device acquires at least one index of the missing at least one log; the log committing active window includes a plurality of logs which have not yet been committed; and logs before the log committing active window have all been committed. The at least one log is requested from the plurality of second node devices based on the at least one index.

In other words, in case of missing at least one log in the log committing active window, the first node device acquires an index of each missing log and then requests the missing log indicated by each index from each second node device based on each acquired index.

In some embodiments, the first node device receives at least one target log returned by the plurality of second node devices and committing condition information of the at least one target log; the target log with the committing condition information of being committed is completed in the log committing active window; and requesting the target log with committing condition information of not being committed from the terminal.

In the above-mentioned process, the first node device sends own commitIndex and isCommited [ ] to each second node device and requests the missing log in the own log committing active window from each second node device; the first node device completes the missing log in the own log committing active window according to the received committed log; and meanwhile, the first node device can request to obtain the committing condition information of the log sent by each second node device, and initializes the data structures matchIndex [ ] [ ] and nextIndex [ ]. The above-mentioned process is completed by a RequestMergeRPC function. On the basis of the above, if having not yet completed the missing log in the own log committing active window, the first node device may request the missing log from the terminal.

In some embodiments, if each second node device or the candidate node device crashes, all RPC messages such as the RequestVoteRPC message, the AppendEntriesRPC message and the RequestMergeRPC message sent to the crashed node device can fail.

These failures are processed by the concurrent Raft algorithm by retrying the RPC message indefinitely. If the crashed node reboots, the RPC message can be completed successfully. If the node device has completed the commands indicated by the RPC message, but crashed before responding to the RPC message, the node device can receive the same RPC message again after rebooting.

In the concurrent Raft algorithm, the RPC message is Idempotent, that is, the node device executes the same message for many times, and a final result is the same. Therefore, repeatedly executing the same RPC message cannot cause any bad effect. For example, if each second node device receives the AppendEntriesRPC request containing existing logs in the own log list, these logs in the new request can be ignored.

The following shows implementation of a voting mechanism of the concurrent Raft algorithm and state variables relevant to the commit process stored on all the node devices in the distributed storage system, as explained below:

---

```
//The known latest term of node (initialized to 0 at initial startup and then monotonically incremented)
int currentTerm
//ID of candidate voted for most recent term
int voteFor
//At any time, the state of each node is one of three roles: leader, candidate, follower
State
//Log list: each of the logs contains commands for execution on the replicated state machine, and term
of the leader when the log is received from leader
LogEntry log[ ]
/**
Commit-related state variables stored on all nodes
*/
//Knonw that all logs before log with index commitindex are committed
int commitIndex
```

```
//Whether logs in log committing active window is committed
//Range of a log with index of [commitIndex+1, commitIndex+toCommitWindowSize+1] is a log
committing active window
bool isCommitted[toCommitWindowSize]
//Size of log committing active window
int toCommitWindowSize
//Whether logs in the log committing active window are received is recorded
bool isReceived[toCommitWindowSize]
```

In some embodiments, in storage scenarios, it is required that the system security cannot depend on time: the system cannot produce incorrect results simply because certain events occur faster or slower than expected. However, the system availability (namely, the ability of the system to respond to the terminal in time) necessarily depends on time. For example, if the time required for information exchange exceeds a typical time before a server cluster (that is, the distributed storage system) crashes, the candidate node devices cannot be able to remain long enough time to win the election; and if a stable first node device is no elected, the concurrent Raft algorithm cannot proceed. In some embodiments, as long as the system meets the following timing requirements: broadcastTime<<electIOnTimeout<<MTBF, the distributed storage system can select and keep the stable first node device.

In an inequation of the above-mentioned time sequence requirement, broadcastTime is an average duration for the first node device to send the RPC message to each second node device in the distributed storage system in parallel and to receive a reply; electionTimeout is an election time-out duration; and MTBF is an average duration between failures of a single second node device.

On the one hand, broadcastTime should be an order of magnitude less than electionTimeout, so that the first node device can reliably and timely send heartbeat messages to the respective second node device, avoiding that the second node device exceeds its own electionTimeout and starts election as a candidate node device. Given the random generation method used for electionTimeout, different electionTimeout for different second node devices also makes split votes less likely to occur.

On the other hand, electionTimeout is orders of magnitude less than MTBF in order for the system to run steadily, otherwise the second node device cannot end electionTimeout in time to start a new election when the first node device crashes. Broadcasttime and MTBF are properties of the system, while electionTimeout is manually set and modified by a technician.

In one embodiment, the RPC message of the concurrent Raft algorithm typically requires the receiving second node device to receive the information and to persistently store the information, so the broadcast duration may be between 0.5 ms and 20 ms, depending on the storage technology. In some embodiments, electionTimeout is set between 10 milliseconds and 500 milliseconds. However, MTBF of a typical server node can last several months or even longer, and thus the inequality of the above timing requirements is easily satisfied.

In some embodiments, since the commit operations of various logs-to-be-committed in the concurrent Raft algorithm are performed out of order, it may result in that an old log has not been committed yet, and a new log depending on the old log has already been committed, where the old log dependent new log means that a storage range of the old log overlaps a storage range of the new log.

From the perspective of the terminal, the ACK message received by the terminal is inconsistent with the order in which the terminal sends the business requests: that is, after the terminal sends a plurality of business requests to the first node device, the ACK message of the old business request has not been returned yet, while the new business request has taken the lead to return the ACK message.

Figure 12:
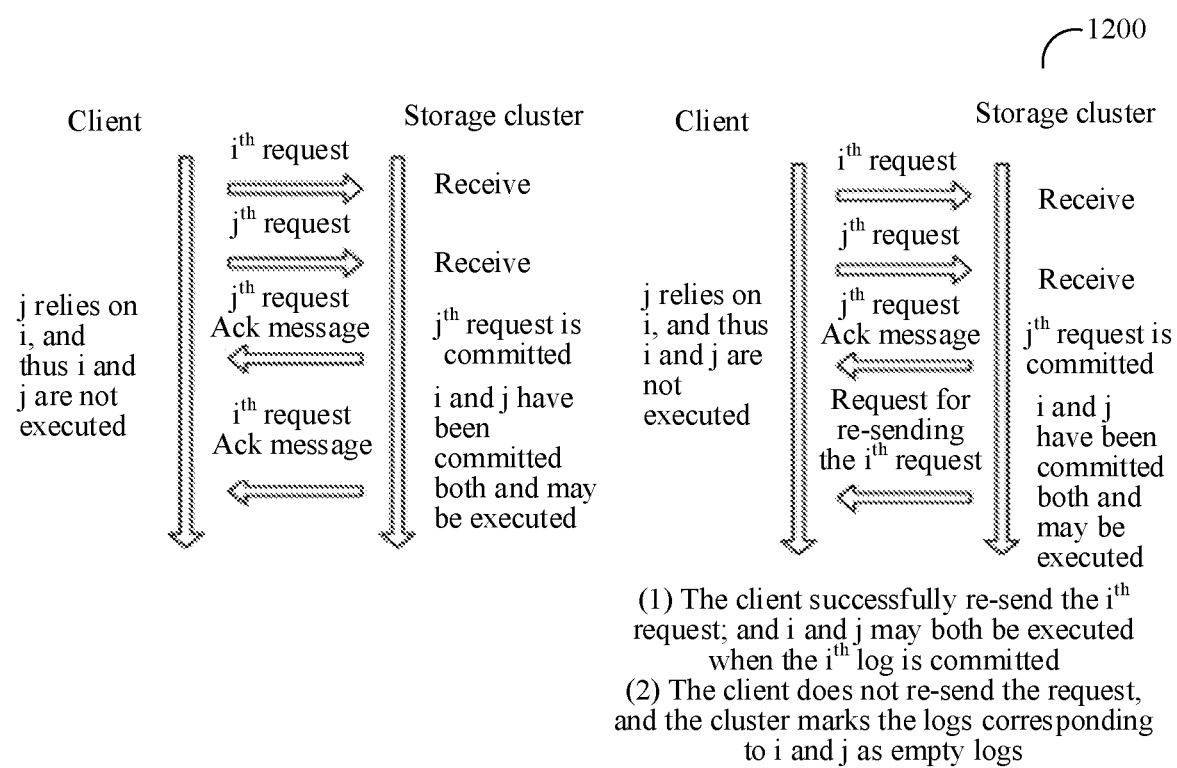
FIG. 12 is a flowchart of a principle that a terminal interacts with a cluster provided by an embodiment of this application.

FIG. 12 is a flowchart of a principle that a terminal interacts with a cluster provided by an embodiment of this application. As shown at 1200, the concurrent Raft algorithm needs to guarantee that if there is a committed log and a log on which the committed log depends has not been committed yet, the system cannot execute such committed log. That is, the concurrent Raft algorithm guarantees the following thing to the terminal: if a storage range of the $i^{th}$ business request overlaps a storage range of the $j^{th}$ business request, and i<j, when the ACK message of the $j^{th}$ business request is received but the ACK message of the $i^{th}$ business request is not received, it means that both the $i^{th}$ and $j^{th}$ business requests have not been executed.

The above thing is divided into the following two cases.

Case 1, in the case that the first node device runs stably, the log corresponding to the above-mentioned $i^{th}$ business request can be finally committed, and the ACK message is returned to the terminal, so that the terminal knows that the $i^{th}$ business request and the $j^{th}$ business request have been successfully committed and safely executed.

Case 2, if the old first node device crashes, the distributed storage system elects a new first node device, and there is no log corresponding to the above-mentioned $i^{th}$ business request on the new first node device (namely, a corresponding log is missing in a log committing active window of the first node device), the new first node device can request to resend the $i^{th}$ business request from the terminal in the election merge recovery phase, so that the new first node device recovers the corresponding log; and if the terminal does not re-send the $i^{th}$ business request to the new first node device (that is, requirement of the new first node device for re-sending the $i^{th}$ business request is out of time for consecutive three times), the $i^{th}$ business request and all business requests after the $i^{th}$ business request and dependent on the $i^{th}$ business request can fail. Also, relevant log items are marked as empty logs in the log list (namely, a log index is assigned to −2), and elements in a second log list FastScanPList and a first log list SlowScanPList corresponding to the empty logs are emptied.

In various embodiments, the concurrent Raft algorithm (belonging to the consistency algorithm) which can be applicable to the distributed storage system is introduced; an upper-layer application, as the client (namely, the terminal), sends a business request to the distributed storage system; the system interacts with the terminal in a manner shown in FIG. 12; a system crash recovery mechanism is provided to guarantee that business data cannot be missing after a system crash; and an out-of-order I/O request can be ordered to guarantee the ordering of the data recovery process. The concurrent Raft algorithm can be applicable to the high concurrent I/O scenarios under the distributed storage system, so that the throughput of the system is effectively increased, and I/O request delay is lowered.

Relevant data structures of various items involved in the above-mentioned various embodiments in the concurrent Raft algorithm are shown below, and the following description is provided:

```
//storage range
struct StoreRange{
    int left;
    int right;
};
//log data structure
struct LogEntry{
    int LogIndex;
    int LogTerm;
    LogComd command;
    //Log hole array
    StoreRange LHA[ ];
};
//Log that has been committed on the first node device
struct CommitedLog{
    int LogIndex;
    int term;
};
//Indeces, overlapping the storage ranges and not being executed (apply)
of logs in the LHA are recorded
struct PendingLog{
    int conflictLogList[conflictLogListSize];
    int conflictLogListSize;
};
//Logs conflicting in strage range and waiting to be executed (apply) are
recorded
struct PendingList{
    PendingLog plog[plogSize];
    int plogSize;
};
//Whether the executed (apply) logs are persisted are recorded
struct Log{
    int LogIndex;
    //state=0 represents that the logs are written to volatile storage medium
and not written to non-volatile storage medium, and state=1 represents that
the logs are written to non-volatile storage medium
    int state;
};
```

In the following, the AppendEntries RPC function for RPC communication between different node devices in the distributed storage system is shown:

```
//The AppendEntries RPC function is called by the first node device to
initiate a log replication request and can also be used as heartbeat
Parameters:
//term of first node device
int term
//id of first node device
int leaderid
//Information of the committed logs on the first node device
CommitedLog leaderCommits[ ]
//Logs required to be stored; (this variable is empty when the
AppendEntries RPC function is used for sending the heartbeat)
LogEntry entries[ ]
Return:
//A return value term is a term of the current second node device
int currentTerm
//A return value success records whether execution is successful
bool success
A receiver (second node device) implements:
```

I) False is returned if term<currentTerm

II) A self log committing active window is traversed; and if the log of the first node device in this range conflicts with the self log (the index is the same but the terms are different), the self log is overwritten by the log of the first node device; and if the first node device in this range sends the log which is missing itself, the log is overwritten to the position of the corresponding index III) Self log committing active window is traversed; and if there is a log that is consistent with the log of the first node device (both the index and the term are the same), and the committed logs of the first node device in this range, the log is marked as commit A RequestVoteRPC function for RPC communication between different node devices in the distributed storage system is shown below, and descriptions are made below:

```
//Candidate node device calls acquired votes
Parameters:
//term of candidate node device
int term
//id of candidate node device
int candidateId
//Logs with indeces less than or equal to commitIndex on the candidate
node device are all committed
int commitIndex
Return:
//A return value term is a term of the current node
int term
//A return value voteGranted indicates whether the node votes on the
candidate
bool voteGranted
```

A receiver (second node device) implements:
  i) False is returned if term<currentTerm
  ii) If voteFor is empty and commitIndex of the candidate node device is greater than or equal to its own commitIndex, the candidate node device is voted A RequestMergeRPC function for RPC communication between different node devices in the distributed storage system is shown below, and descriptions are made below:

```
//a new first node device is successfully elected; and in order to guarantee
the continuity of logs in the log list of the first node device, the second
node device is requested to send the missing logs to itself
Parameters:
//term of first node device
int term
//id of first node device
int leaderid
//Whether the log in the log committing active window of the first node
device is committed is recorded
int isCommitted[ ]
Return:
//A return value term is a term of the current second node device
int currentTerm
//A log which is committed on the second node device and has the index
in the range of the log committing active window of the first node device
is returned
Log logs[ ]
//The log committing condition in the log list of the second node device is
returned
bool logcommits[ ]
```

Figure 13:
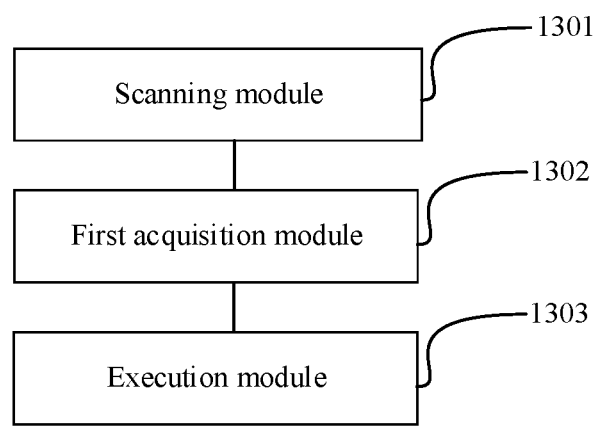
FIG. 13 is a schematic diagram of a structure of a log execution apparatus provided by an embodiment of this application.

The receiver Implementation:
  (I) currentTerm is returned if term<currentTerm
  (II) The committing conditions of logs which are commit and have indeces in the log committing active window of the first node device and logs in the log list are returned Server behaviors of the distributed storage system (that is, the behavior of an entire server cluster for providing distributed storage services) are shown below:

All Servers:
- (i) Out-of-order ack and out-of-order commit processes for logs are performed
- (ii) Out of order apply process for logs is performed Second Node Device Behaviors:
- a. responding to the RPC function of the candidate node device and the first node device, and
- b. switching to a candidate node device if the election time expires and no AppendEntries RPC message is received from the first node device or the candidate node device promising to the vote Candidate Node Device Behaviors:
- A. self-increasing currentTerm
- B. voting oneself
- C. resetting election time counter
- D. sending RequestVote RPC to all other node devices
- E. becoming the first node device if most votes are received
- F. if the AppendEntries RPC message is received from the new first node device, switching to a second node device, and
- G. starting a new election cycle if the election time expires First Node Device Behaviors:
- I. sending the heartbeat to each other node device (through AppendEntries RPC with empty log), converting each other node device to the second node device, repeatedly sending the heartbeat, and preventing the election time from expiring
- II. before providing services to the cluster, performing an election Merge recovery phase first to recover the missing logs thereof, to guarantee the continuity of the self logs and acquire the committing conditions of the logs on other node devices at the same time
- III. upon receiving the command from the terminal, appending the log at the back of its own log list, sending AppendEntries RPC to other nodes, and restoring ack information to the terminal when the log is committed FIG. 13 is a schematic diagram of a structure of a log execution apparatus provided by an embodiment of this application. With reference to FIG. 13, the apparatus is located in a distributed storage system; and the apparatus includes the following modules:
- a scanning module 1301 configured to circularly scan a log execution active window, where the log execution active window includes a plurality of logs which have not been executed, and all the logs before the log execution active window have been executed;
- a first acquisition module 1302 configured to, with regard to any log in the log execution active window, acquire a conflict verification result of the log based on storage range information of the log, where the storage range information is used for indicating a storage range of the log and storage ranges of a target number of logs before the log, the target number is equal to a size of the log execution active window; and
- an execution module 1303 configured to execute the log if the conflict verification result is no conflict.

The apparatus provided by the embodiments of this application can learn whether the log can cause the data inconsistency problem in the entire distributed storage system by setting the log execution active window and guaranteeing that all the logs before the log execution active window have been executed, and only needing to verify whether any log in the log execution active window conflicts with storage ranges of logs which are located in the log execution active window and before the log and has not been executed; and with regard to the conflict-free log, out-of-order execution is supported without blocking the execution process of the log and without waiting for the logs which are located in the log execution active window and before the log and has not been executed, so that the throughput of the distributed storage system can be greatly increased, and the apparatus can be applicable to the high concurrency scenarios.

In some embodiments, the first acquisition module 1302 is configured to: read storage range information of the log to obtain a storage range of the log and storage ranges of a target number of logs before the log; in the case that an intersection set between the storage range of the log and the storage ranges of the target number of logs is an empty set, it is determined that a conflict verification result is no conflict; and in the case that the intersection set between the storage range of the log and the storage ranges of the target number of logs is not the empty set, it is determined that the conflict verification result is conflict occurrence.

In some embodiments, based on the composition of the apparatus in FIG. 13, the execution module 1303 includes: an adding unit configured to add the log to a log list-to-be-executed; and a processing unit configured to call a log execution thread to process a log stored in the log list-to-be-executed.

In some embodiments, the processing unit is configured to: write business data corresponding to a log stored in the log list-to-be-executed into a volatile storage medium; add a log corresponding to the business data written to the volatile storage medium to an executed log list; and in the case that the data stored the volatile storage medium is greater than or equal to the storage threshold, writing the business data stored in the volatile storage medium to the non-volatile storage medium, where different state parameters are set in the executed log list respectively for logs, of which the business data is not written to the non-volatile storage medium, and logs, of which business data is written to the non-volatile storage medium.

In some embodiments, based on the apparatus composition in FIG. 13, the apparatus further includes: a second acquisition module configured to acquire a plurality of logs-to-be-restored from the executed log list based on the state parameters when the distributed storage system restarts in the case that a crash event occurs in the distributed storage system, where the business data corresponding to the logs-to-be-restored has been written to the volatile storage medium rather than to the non-volatile storage medium; and a restoration module configured to restore a plurality of business data corresponding to the plurality of logs-to-be-restored to the volatile storage medium in sequence based on a storage order of the plurality of logs-to-be-restored in the executed log list.

In some embodiments, based on the apparatus composition in FIG. 13, the apparatus further includes: a third acquisition module configured to acquire the number of logs in conflict with the log when the conflict verification result is conflict occurrence; a determination module configured to determine a scanning frequency of the log based on the number of logs; and the execution module 1303, further configured to scan the log based on the scanning frequency and refresh the conflict verification result until the conflict verification result is no conflict, and execute the log.

In some embodiments, the determination module is configured to: determine the scanning frequency as a first frequency if the number of logs is greater than a conflict threshold; or in the case that the number of logs is less than or equal to the conflict threshold, the scanning frequency is determined as a second frequency, where the second frequency is greater than the first frequency.

In some embodiments, the execution module 1303 is configured to: add the log to a log list corresponding to the scanning frequency, and scan the log stored in the log list based on the scanning frequency.

In some embodiments, the scanning module 1301 is further configured to: circularly scan a log matching index table, where the log matching index table is used for recording the number of copies of a plurality of logs-to-be-committed stored in the distributed storage system. The apparatus further includes a committing module configured to commit the logs-to-be-committed if the number of copies of any log-to-be-committed in the log matching index table meets a target condition.

In some embodiments, the apparatus is elected by votes by a plurality of second node devices in the distributed storage system after the end of a last term; and a maximum index in consecutive committed logs in the apparatus is greater than or equal to a maximum index in consecutive committed logs in the plurality of second node devices.

In some embodiments, based on the apparatus composition in FIG. 13, the apparatus further includes: a fourth acquisition module configured to acquire an index of each missing log in the case of missing at least one log in the log committing active window, where the log committing active window includes a plurality of logs which have not been committed yet, and all the logs before the log committing active window have been committed; and a requesting module configured to request the missing log from the plurality of second node devices based on the index.

In some embodiments, based on the apparatus composition in FIG. 13, the apparatus further includes: a receiving module configured to receive target logs returned by the plurality of second node devices and committing condition information of the target logs; a completion module configured to complete a target log with the committing condition information as committed in the log committing active window; and the requesting module further configured to request a target log with the committing condition information as an uncommitted from the terminal.

Any combination of the foregoing optional technical solutions may be used to form an optional embodiment of this application. Details are not described herein again.

It is to be noted that the log execution apparatus provided in the foregoing embodiment when executing a log is illustrated with an example of division of each functional module. In practical application, the function distribution may be implemented by different functional modules according to requirements, that is, an internal structure of the computer device is divided into different functional modules, to implement all or some of the functions described above. In addition, the log execution apparatus and log execution method embodiments provided in the above embodiments belong to the same concept. For the specific implementation process, reference may be made to the log execution method embodiments, and details are not described herein again.

Figure 14:
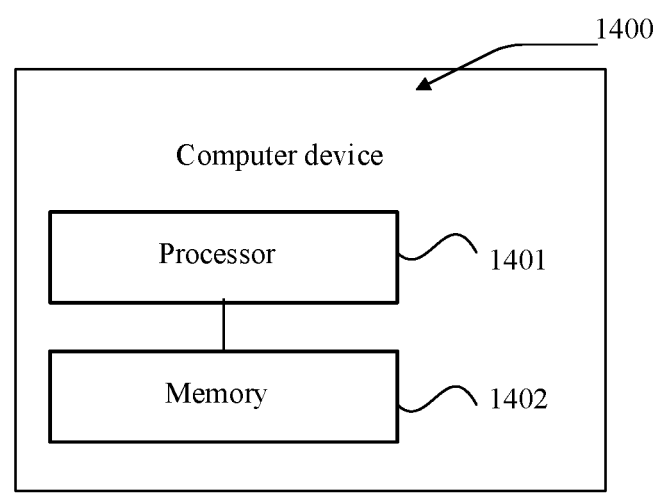
FIG. 14 is a schematic diagram of a structure of a computer device provided by an embodiment of this application.

FIG. 14 is a schematic structural diagram of a computer device according to an embodiment of this application. A computer device 1400 may vary due to different configurations or performance, and the computer device 1400 may include one or more central processing units (CPUs) 1401 and one or more memories 1402. The memory 1402 stores at least one computer program, the at least one computer program being loaded and executed by one or more processors 1401 to implement the log execution method provided in the foregoing method embodiments. In some embodiments, the computer device 1400 further includes components such as a wired or wireless network interface, a keyboard, and an I/O interface for ease of I/O, and the computer device 1400 further includes other components for implementing functions of the device. Details are not described herein again.

In one embodiment, a computer-readable storage medium, for example, a memory including at least one computer program is further provided. The at least one computer program may be executed by a processor in a terminal to implement the log execution method in the foregoing embodiments. For example, the computer-readable storage medium includes a read-only memory (ROM), a random access memory (RAM), a compact disc read-only memory (CD-ROM), a magnetic tape, a floppy disk, an optical data storage device, or the like.

In one embodiment, a computer program product or a computer program is further provided, including one or more pieces of program code, the one or more pieces of program code being stored in a computer-readable storage medium. One or more processors of a computer device can read the one or more pieces of program code from the computer-readable storage medium, and the one or more processors execute the one or more pieces of program code to enable the computer device to implement log execution method in the foregoing embodiments.

A person of ordinary skill in the art may understand that all or some of the steps of the foregoing embodiments may be implemented by hardware or may be implemented by a program instructing relevant hardware. In some embodiments, the program is stored in a computer-readable storage medium. In some embodiments, the storage medium mentioned above is a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A log execution method, performed by a first node device in a distributed storage system, and comprising:
   circularly scanning a log execution active window, the log execution active window comprising a plurality of logs which are not executed, and all the logs before the log execution active window having been executed;
   acquiring a conflict verification result of a log in the log execution active window based on storage range information of the log, the storage range information indicating a storage range of the log and a storage range of a target number of logs before the log, and the target number being equal to a size of the log execution active window; and
   executing the log if the conflict verification result is no conflict, comprising:
      writing the business data corresponding to the logs stored in a log list-to-be-executed into a volatile storage medium or a non-volatile storage medium;
      adding the logs corresponding to the business data written to the volatile storage medium to an executed log list, wherein different state parameters are set in the executed log list for logs, of which the business data is not written to the non-volatile storage medium, and for logs, of which the business data is written to the non-volatile storage medium, respectively; and after a crash event occurs in the distributed storage system, acquiring, when the distributed storage system is restarted, a plurality of logs-to-be-restored from the executed log list based on the state parameters, and restoring business data corresponding to the plurality of logs-to-be-restored to the volatile storage medium in sequence based on a storage order of the plurality of logs-to-be-restored in the executed log list.

2. The method according to claim 1, wherein the operation of obtaining the conflict verification result of the log based on the storage range information of the log comprises:

reading the storage range information of the log, and obtaining the storage range of the log and the storage range of the target number of logs before the log;

if an intersection set between the storage range of the log and the storage range of the target number of logs is an empty set, determining the conflict verification result as no conflict; and if the intersection set between the storage range of the log and the storage range of the target number of logs is not the empty set, determining the conflict verification result as conflict occurrence.

3. The method according to claim 1, wherein the operation of executing the log comprises:

adding the log to the log list-to-be-executed; and
calling a log execution thread to process logs stored in the log list-to-be-executed.

4. The method according to claim 3, wherein processing the logs stored in the log list-to-be-executed comprising:

if a data stored in the volatile storage medium is greater than or equal to a storage threshold, writing the business data stored in the volatile storage medium to a non-volatile storage medium.

5. The method according to claim 1, further comprising:
if the conflict verification result is conflict occurrence, acquiring a number of logs in conflict with the logs;
determining a scanning frequency for the logs based on the number of logs; and
scanning the logs based on the scanning frequency, refreshing the conflict verification result until the conflict verification result is no conflict, and executing the logs.

6. The method according to claim 5, wherein the operation of determining the scanning frequency for the logs based on the number of logs comprises:

determining the scanning frequency as a first frequency if the number of logs is greater than a conflict threshold; or, if that the number of logs is less than or equal to the conflict threshold, determining the scanning frequency as a second frequency, wherein the second frequency is greater than the first frequency.

7. The method according to claim 5, wherein the operation of scanning the logs based on the scanning frequency comprises:

adding the logs to a log list corresponding to the scanning frequency, and scanning the logs stored in the log list based on the scanning frequency.

8. The method according to claim 1, further comprising:
circularly scanning a log matching index table, the log matching index table being used for recording the number of copies of a plurality of logs-to-be-committed stored in the distributed storage system; and committing the logs-to-be-committed if the number of copies of any logs-to-be-committed in the log matching index table meets a target condition.

9. The method according to claim 1, wherein the first node device is elected by votes from a plurality of second node devices in the distributed storage system after the end of a last term, and a maximum index in consecutive committed logs in the first node device is greater than or equal to a maximum index in consecutive committed logs in the plurality of second node devices.

10. The method according to claim 9, further comprising:
if at least one log is missing in a log committing active window, acquiring an index of each missing log, the log committing active window comprising a plurality of logs which are not committed, and all the logs before the log committing active window having been committed; and based on the index, requesting the missing log from the plurality of second node devices.

11. The method according to claim 10, further comprising:

receiving target logs returned by the plurality of second node devices and committing condition information of the target logs;

completing a target log with the committing condition information of being committed in the log committing active window; and requesting a target log with the committing condition information of being uncommitted from a terminal.

12. A computer device, comprising one or more processors and one or more memories storing at least one computer program, the at least one computer program being loaded and executed by the one or more processors to implement:

circularly scanning a log execution active window, the log execution active window comprising a plurality of logs which are not executed, and all the logs before the log execution active window having been executed;

acquiring a conflict verification result of a log in the log execution active window based on storage range information of the log, the storage range information indicating a storage range of the log and a storage range of a target number of logs before the log, and the target number being equal to a size of the log execution active window; and executing the log if the conflict verification result is no conflict, comprising:

writing, by the one or more processors, the business data corresponding to the logs stored in a log list-to-be-executed into a volatile storage medium or a non-volatile storage medium stored in the one or more memories;

adding, by the one or more processors, the logs corresponding to the business data written to the volatile storage medium to an executed log list in the one or more memories, wherein different state parameters are set in the executed log list for logs in the one or more memories, of which the business data is not written to the non-volatile storage medium, and for logs, of which the business data is written to the non-volatile storage medium, respectively; and after a crash event occurs in the distributed storage system, acquiring, by the one or more processors, when the distributed storage system is restarted, a plurality of logs-to-be-restored from the executed log list based on the state parameters, and restoring business data corresponding to the plurality of logs-to-be-restored to the volatile storage medium in the one or more memories in sequence based on a storage order of the plurality of logs-to-be-restored in the executed log list.

13. The computer device according to claim 12, wherein the operation of obtaining the conflict verification result of the log based on the storage range information of the log comprises:
    reading the storage range information of the log, and obtaining the storage range of the log and the storage range of the target number of logs before the log;
    if an intersection set between the storage range of the log and the storage range of the target number of logs is an empty set, determining the conflict verification result as no conflict; and
    if the intersection set between the storage range of the log and the storage range of the target number of logs is not the empty set, determining the conflict verification result as conflict occurrence.

14. The computer device according to claim 12, wherein the operation of executing the log comprises:
    adding the log to the log list-to-be-executed; and
    calling a log execution thread to process logs stored in the log list-to-be-executed.

15. The computer device according to claim 14, wherein the processing the logs stored in the log list-to-be-executed comprising:
    if a data stored in the volatile storage medium is greater than or equal to a storage threshold, writing the business data stored in the volatile storage medium to a non-volatile storage medium.

16. A non-transitory computer readable storage medium, storing at least one computer program, the at least one computer program being loaded and executed by a processor to implement:
    circularly scanning a log execution active window, the log execution active window comprising a plurality of logs which are not executed, and all the logs before the log execution active window having been executed;
    acquiring a conflict verification result of a log in the log execution active window based on storage range information of the log, the storage range information indicating a storage range of the log and a storage range of a target number of logs before the log, and the target number being equal to a size of the log execution active window; and
    executing the log if the conflict verification result is no conflict, comprising:
        writing, by the processor, the business data corresponding to the logs stored in a log list-to-be-executed into a volatile storage medium or a non-volatile storage medium stored;
        adding, by the processor, the logs corresponding to the business data written to the volatile storage medium to an executed log list, wherein different state parameters are set in the executed log list for logs, of which the business data is not written to the non-volatile storage medium, and for logs, of which the business data is written to the non-volatile storage medium, respectively; and
        after a crash event occurs in the distributed storage system, acquiring, by the processor, when the distributed storage system is restarted, a plurality of logs-to-be-restored from the executed log list based on the state parameters, and restoring business data corresponding to the plurality of logs-to-be-restored to the volatile storage medium in sequence based on a storage order of the plurality of logs-to-be-restored in the executed log list.

17. The computer readable storage medium according to claim 16, the method further comprising:
    if the conflict verification result is conflict occurrence, acquiring a number of logs in conflict with the logs;
    determining a scanning frequency for the logs based on the number of logs; and
    scanning the logs based on the scanning frequency, refreshing the conflict verification result until the conflict verification result is no conflict, and executing the logs.

18. The computer readable storage medium according to claim 17, wherein the operation of determining the scanning frequency for the logs based on the number of logs comprises:
    determining the scanning frequency as a first frequency if the number of logs is greater than a conflict threshold; or,
    if that the number of logs is less than or equal to the conflict threshold, determining the scanning frequency as a second frequency, wherein the second frequency is greater than the first frequency.

* * * * *